United States Patent
Patt et al.

(10) Patent No.: US 12,353,483 B2
(45) Date of Patent: Jul. 8, 2025

(54) IDENTIFYING NON-FUNGIBLE TOKENS AND RELATED CONTENT FOR INDEXING

(71) Applicant: Google LLC, Mountain View, CA (US)

(72) Inventors: Daniel Patt, Saratoga, CA (US); Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/043,930

(22) PCT Filed: Jun. 30, 2022

(86) PCT No.: PCT/US2022/035729
§ 371 (c)(1),
(2) Date: Mar. 3, 2023

(87) PCT Pub. No.: WO2024/005825
PCT Pub. Date: Jan. 4, 2024

(65) Prior Publication Data
US 2024/0281476 A1    Aug. 22, 2024

(51) Int. Cl.
*G06F 16/951* (2019.01)
*H04L 9/00* (2022.01)
*H04L 9/32* (2006.01)

(52) U.S. Cl.
CPC .......... *G06F 16/951* (2019.01); *H04L 9/3213* (2013.01); *H04L 9/50* (2022.05)

(58) Field of Classification Search
CPC .............. G06F 16/951; G06F 16/134; G06F 16/1815; G06F 16/275; H04L 9/3213; H04L 9/50
See application file for complete search history.

(56) References Cited

U.S. PATENT DOCUMENTS

| | | | |
|---|---|---|---|
| 9,747,096 B2* | 8/2017 | Searle | H04L 63/10 |
| 10,600,009 B1* | 3/2020 | Augustine | H04L 9/0637 |
| 2019/0156923 A1* | 5/2019 | Kain | G06N 20/00 |
| 2020/0005284 A1 | 1/2020 | Vijayan | |
| 2020/0242105 A1 | 7/2020 | Rich et al. | |
| 2021/0065070 A1* | 3/2021 | Augustine | G06Q 50/01 |

(Continued)

OTHER PUBLICATIONS

International Search Report for Application No. PCT/US2022/035729, mailed on Jan. 25, 2023, 5 pages.

(Continued)

*Primary Examiner* — Sm A Rahman
(74) *Attorney, Agent, or Firm* — DORITY & MANNING, P.A.

(57) ABSTRACT

Systems and methods for identifying token data can include processing blockchain data to determine candidate token data, which can be processed to determine whether the candidate token data is associated with a blockchain trigger event that is associated with a non-fungible token. The systems and methods can process the output action of a blockchain trigger event to determine whether the output action acts similar to the output action of a non-fungible token. The determination may be based on the candidate token data being associated with one or more standards. The identified token data can be indexed and can then be surfaced in response to a search query. The surfaced index data can be provided for display in a search results page.

20 Claims, 18 Drawing Sheets

(56) References Cited

U.S. PATENT DOCUMENTS

2021/0256113 A1\* 8/2021 Stott .................. H04L 9/3239
2021/0390531 A1 12/2021 Voorhees et al.

OTHER PUBLICATIONS

International Preliminary Report on Patentability for Application No. PCT/US2022/035729, mailed Jan. 9, 2025, 10 pages.

\* cited by examiner

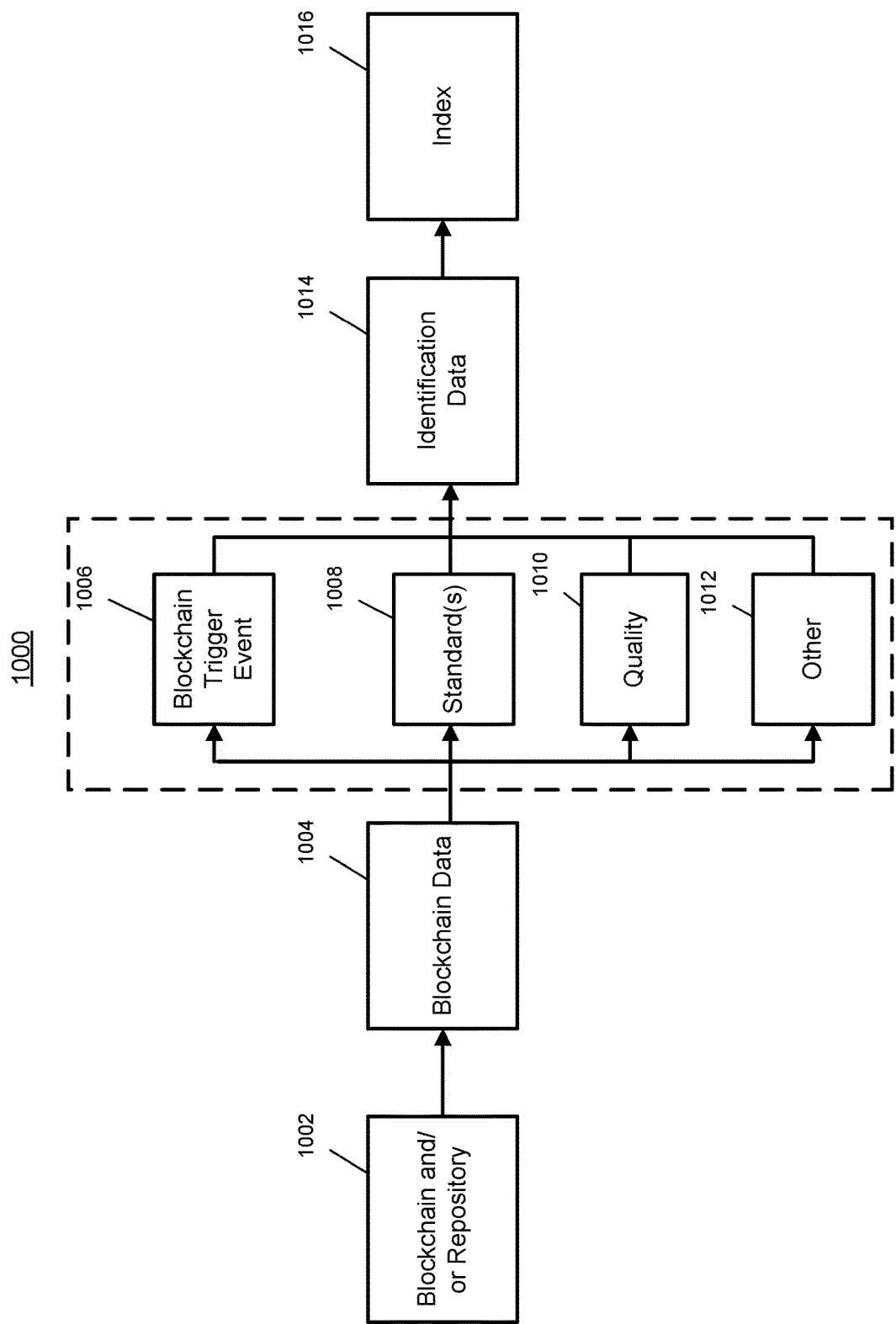

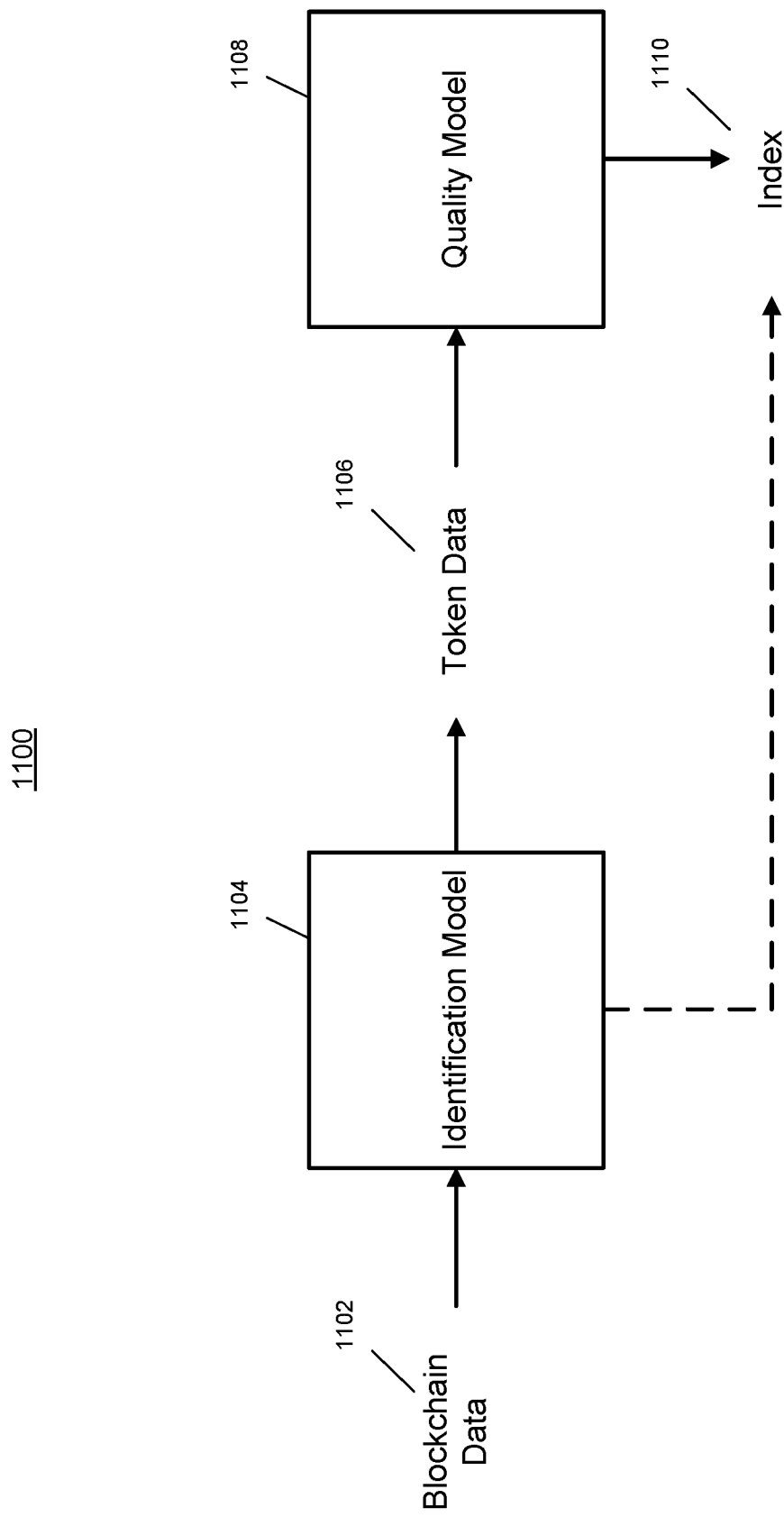

IDENTIFYING NON-FUNGIBLE TOKENS AND RELATED CONTENT FOR INDEXING

PRIORITY CLAIM

This application is based upon and claims the right of priority under 35 U.S.C. § 371 to International Application No. PCT/US2022/035729 filed on Jun. 30, 2022, which is incorporated by reference herein.

FIELD

The present disclosure relates generally to identifying token data associated with a non-fungible token minted on a blockchain. More particularly, the present disclosure relates to obtaining blockchain data, processing the blockchain data to determine candidate token data, and processing the candidate token data to determine whether the candidate token data is associated with a non-fungible token.

BACKGROUND

Search engines can receive search queries and provide search results listing web pages determined to be responsive to the search query. The search engine may crawl the web to determine web pages that have certain terms. The search results can be generally indicated with captions and/or text titles. The search results can include text results, video results, and image results.

However, searching and identifying non-fungible token search results can be difficult. Searching for non-fungible tokens can be limited to finding general web pages that are associated with the different non-fungible tokens; however, the search engine may be unable to properly identify and verify the non-fungible token search result as a non-fungible token.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining blockchain data. The blockchain data can include byte code associated with a blockchain. The operations can include processing the blockchain data to determine that a subset of the blockchain data includes candidate token data. In some implementations, the candidate token data can be associated with a blockchain trigger event. The operations can include determining an output action associated with the blockchain trigger event. The output action can be associated with a digital resource. The operations can include processing the output action to determine that the candidate token data is descriptive of a non-fungible token and providing identification data as an output. The identification data can be descriptive of the candidate token data being associated with the non-fungible token.

In some implementations, processing the output action to determine the candidate token data is descriptive of the non-fungible token can include determining an entity associated with the output action and determining the entity is a digital resource being transferred in response to the blockchain trigger event. The operations can include determining a validity of the candidate token data. The validity can be determined based on whether the candidate token data includes determined problematic characteristics. The identification data can be generated based at least in part on the validity.

In some implementations, processing the output action to determine the candidate token data is descriptive of the non-fungible token can include determining the output action comprises a link to a landing address, obtaining landing data associated with the landing address, processing the landing data to determine the landing data comprises a digital resource, and determining the digital resource is associated with the non-fungible token. The operations can include processing the output action to determine a digital resource associated with the non-fungible token, processing the digital resource to determine a quality of the digital resource, and determining whether to index the candidate token data based at least in part on the identification data and the quality of the digital resource.

In some implementations, the quality of the digital resource can be determined based on at least one of a resolution of the digital resource, a size of the digital resource, or a determined uniqueness of the digital resource. In some implementations, processing the output action to determine the candidate token data is descriptive of the non-fungible token can include obtaining, via an application programming interface, a uniform resource identifier. The candidate token data can be determined based on one or more standards associated with non-fungible token code standards. In some implementations, the candidate token data can include reference data associated with the digital resource.

Another example aspect of the present disclosure is directed to a computer-implemented method. The method can include obtaining, by a computing system including one or more processors, blockchain data. The blockchain data can include byte code associated with a blockchain. The method can include processing, by the computing system, the blockchain data to determine that a subset of the blockchain data includes candidate token data. The candidate token data can be associated with a blockchain trigger event. The method can include obtaining, by the computing system, standard data. The standard data can include one or more standards associated with standards for a non-fungible token. The method can include processing, by the computing system, the candidate token data to determine the candidate token data is associated with the one or more standards. In some implementations, the method can include generating, by the computing system, identification data based on the candidate token data being associated with the one or more standards. The identification data can be descriptive of the candidate token data being associated with the non-fungible token. The method can include providing, by the computing system, the identification data as output.

In some implementations, the method can include generating, by the computing system, index data based on the candidate token data and the identification data. The method can include processing, by the computing system, the blockchain trigger event to determine a digital resource associated with the non-fungible token: processing, by the computing system, the digital resource to determine the digital resource is vulgar; and determining, by the computing system, whether to index the candidate token data based at least in part on the identification data and the digital resource being vulgar.

In some implementations, obtaining, by the computing system including the one or more processors, the blockchain data can include obtaining, by the computing system, first node data from a blockchain node. The blockchain node can be associated with a particular blockchain. Obtaining, by the computing system including the one or more processors, the blockchain data can include processing, by the computing system, the first node data in a sandbox to generate a first portion of the blockchain data and storing, by the computing system, the first portion of the blockchain data.

In some implementations, obtaining, by the computing system including the one or more processors, the blockchain data can include obtaining, by the computing system, second node data from the blockchain node. The blockchain node can be associated with the particular blockchain. Obtaining, by the computing system including the one or more processors, the blockchain data can include processing, by the computing system, the second node data in the sandbox to generate a second portion of the blockchain data and storing, by the computing system, the second portion of the blockchain data.

Another example aspect of the present disclosure is directed to one or more non-transitory computer-readable media that collectively store instructions that, when executed by one or more computing devices, cause the one or more computing devices to perform operations. The operations can include obtaining blockchain data. The blockchain data can include byte code associated with a blockchain. The operations can include processing the blockchain data to determine a subset of the blockchain data comprises candidate token data. In some implementations, the candidate token data can be associated with a blockchain trigger event. The operations can include processing the candidate token data to determine an intent associated with the candidate token data. The candidate token data can include reference data associated with a digital resource. The operations can include processing the intent to determine the candidate token data is descriptive of a non-fungible token and providing identification data as an output. In some implementations, the identification data can be descriptive of the candidate token data being associated with the non-fungible token.

In some implementations, the intent can be determined based at least in part on the blockchain trigger event. The candidate token data can include data descriptive of a smart contract. The blockchain trigger event can be an event that triggers the transfer of a payload of a smart contract. In some implementations, the intent can be a minting intent to publish the non-fungible token on the blockchain. The intent can be determined based at least in part on freeform text in the candidate blockchain data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example token data identification system according to example embodiments of the present disclosure.

FIG. 3 depicts a block diagram of an example index filtering system according to example embodiments of the present disclosure.

Figure 1A:
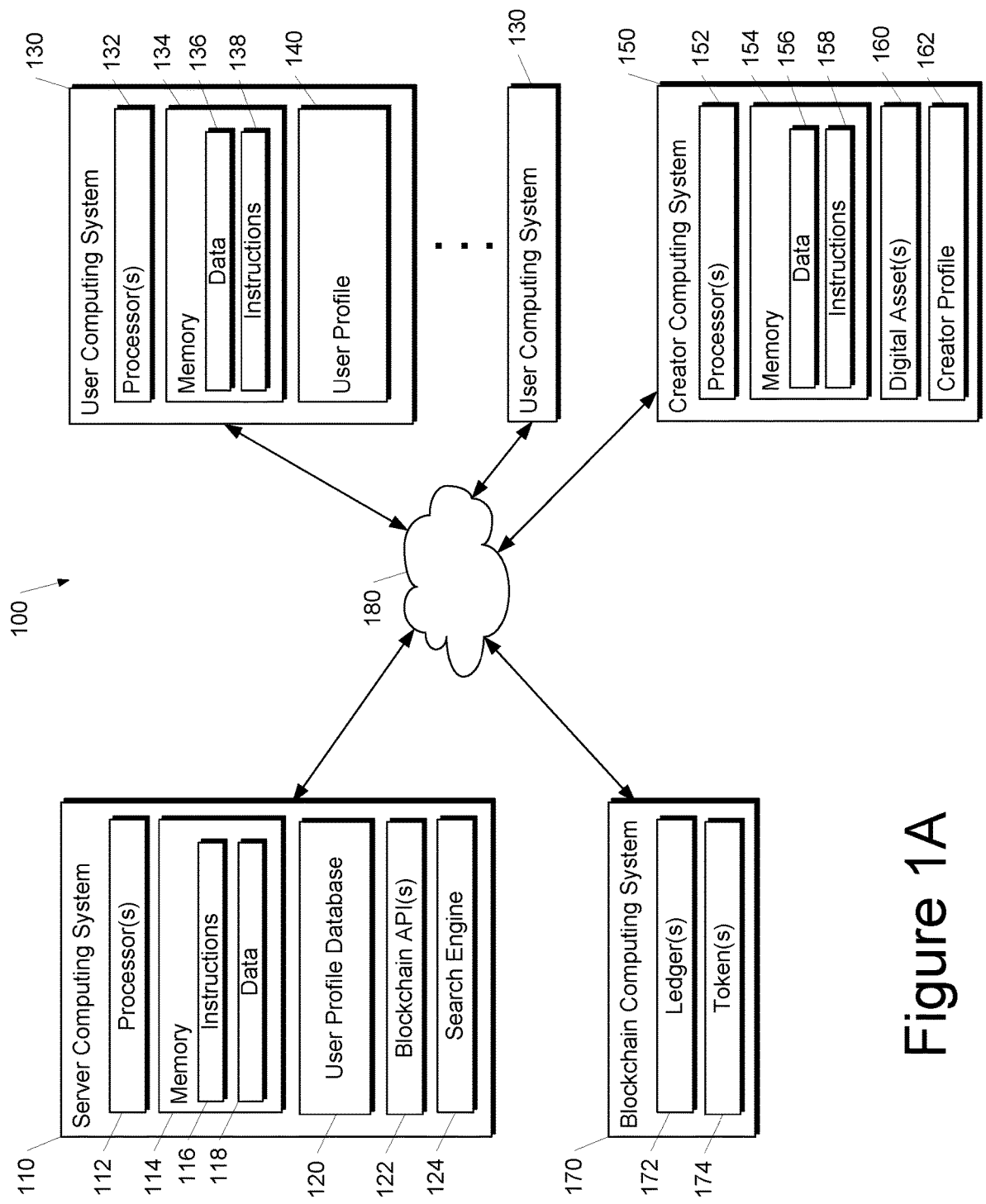
FIG. 1A depicts a block diagram of an example computing system that performs token data identification and non-fungible token indexing according to example embodiments of the present disclosure.

Reference numerals that are repeated across plural figures are intended to identify the same features in various implementations.

DETAILED DESCRIPTION

Overview

Generally, the present disclosure is directed to systems and methods for identifying token data in blockchain data.

In particular, the systems and methods can leverage blockchain trigger event determination and processing to identify data descriptive of a non-fungible token. The systems and methods can include obtaining blockchain data. The blockchain data can include byte code associated with a blockchain. The blockchain data can be processed to determine a subset of the blockchain data includes candidate token data. In other words, the blockchain data may be processed to determine that candidate token data is included in a subset of the blockchain data. In some implementations, the candidate token data can be associated with a blockchain trigger event. An output action associated with the blockchain trigger event can be determined. The output action can be associated with a digital resource. The output action can be processed to determine that the candidate token data is descriptive of a non-fungible token. Identification data can be provided as an output. The identification data can be descriptive of the candidate token data being associated with the non-fungible token.

The systems and methods disclosed herein can be utilized for enabling a non-fungible token search via a search engine. For example, a search query can be received. A search engine can process the search query and can determine a plurality of search results associated with the search query. In some implementations, one or more search results can be associated with non-fungible tokens. A particular search result can be associated with the index data. The one or more non-fungible token search results can be provided for display in a search results interface (e.g., a search results page). The one or more non-fungible token search results can be provided for display in a separate panel. Alternatively and/or additionally, the one or more non-fungible token search results can be provided for display adjacent to general search results. The one or more non-fungible token search results can be provided with one or more indicators indicating the non-fungible token nature (e.g., provided with one or more labels, flags, and/or tags). In some implementations, the one or more non-fungible token search results can be provided with a generated preview of the digital resource based on the index data.

In some implementations, the systems and methods disclosed herein can be utilized for Web3 profiles, for Web3 transactions, and/or for Web3 identification.

The systems and methods can improve the search user interface and user experience by identifying and indexing relevant data that can be utilized for determining the non-fungible token is responsive to a search query. Additionally and/or alternatively, the index data can be leveraged to determine a ranking for the non-fungible token search result with relation to other search results. The systems and methods can be utilized to determine if a search result can be provided with a non-fungible token tag and/or can be given a ranking boost based on the association with an authenticated non-fungible token. The systems and methods can be utilized for identification of not only non-fungible tokens that are pre-flagged or strictly follow non-fungible token standards, but can also identify datasets intended to act as non-fungible tokens despite errors or lack of compliance of certain procedures or rules.

The systems and methods can obtain blockchain data. The blockchain data can be associated with a blockchain that stores data in a decentralized and distributed system. For example, the blockchain data can include byte code associated with a blockchain. The blockchain data can be associated with a plurality of non-fungible tokens. The plurality of non-fungible tokens can be associated with a plurality of digital resources (e.g., a plurality of digital assets). In some implementations, the blockchain data can be obtained from a blockchain node associated with a particular blockchain. The blockchain data can include prefiltered blockchain data that has been processed to filter out data that may not be utilized during identification and/or indexing.

The systems and methods can process the blockchain data to determine a subset of the blockchain data includes candidate token data. That is, the blockchain data may be processed in order to determine, or identify, a subset thereof which includes candidate token data. The candidate token data can be associated with a blockchain trigger event (e.g., an if-then event that can cause a transfer of a digital resource (e.g., a digital asset)). In some implementations, the candidate token data can be determined based on one or more standards associated with non-fungible token code standards. Additionally and/or alternatively, the candidate token data can include reference data associated with the digital resource. The blockchain trigger event can be associated with a smart contract. In some implementations, the candidate token data can be determined by parsing the blockchain data into segments that can be individually processed. The candidate token data may be determined based on the determination that the subset of blockchain data is associated with a smart contract. The smart contract can include a blockchain trigger event, and the blockchain trigger event can include an event in which a payload (e.g., a digital resource) is transferred in response to a transfer request (e.g., a purchase of the digital resource with crypto currency).

An output action associated with the blockchain trigger event can be determined. The output action can be associated with a digital resource. In some implementations, the output action can be a resulting action in response to the blockchain trigger event occurring. The output action can be associated with an embedded uniform resource identifier and/or an embedded uniform resource locator.

In some implementations, processing the output action to determine the candidate token data is descriptive of the non-fungible token can include determining an entity associated with the output action and determining the entity is a digital resource (e.g., a digital asset) being transferred in response to the blockchain trigger event. Alternatively and/or additionally, the entity can be processed to determine the smart contract is an empty contract. In response to the smart contract being an empty contract, the identification data may be descriptive of the candidate token data not being data to index.

Alternatively and/or additionally, processing the output action to determine the candidate token data is descriptive of the non-fungible token can include determining the output action includes a link to a landing address (e.g., a landing web page and/or a landing storage file). Landing data associated with the landing address can be obtained. The landing data can then be processed to determine the landing data includes a digital resource (e.g., a digital asset). The digital resource can be determined to be associated with the non-fungible token.

Alternatively and/or additionally, processing the output action to determine the candidate token data is descriptive of the non-fungible token can include obtaining, via an application programming interface, a uniform resource identifier.

The output action can be processed to determine the candidate token data is descriptive of a non-fungible token. The determination can be determined based on the output action being associated with a digital resource (e.g., a digital asset). In some implementations, the determination can be determined based on the output action being descriptive of an intent for the smart contract to be associated with a non-fungible token.

Identification data can be provided as an output. The identification data can be descriptive of the candidate token data being associated with the non-fungible token. The identification data can be generated based on the determination that the candidate token data is descriptive of the non-fungible token. The identification data can be descriptive of the candidate token data including token data for indexing.

In some implementations, the systems and methods can include determining a validity of the candidate token data. The validity can be determined based on whether the candidate token data includes determined problematic characteristics. The identification data may be generated based at least in part on the validity. Additionally or alternatively, the determined validity of the candidate token data may be used to either allow or prevent further actions, thereby improving security and preventing fraudulent or invalid candidate token data from being used.

In some implementations, the systems and methods can include processing the output action to determine a digital resource (e.g., a digital asset) associated with the non-fungible token. The digital resource can be processed to determine a quality of the digital resource (e.g., the quality of the digital asset). The systems and methods can determine whether to index the candidate token data based at least in part on the identification data and the quality of the digital resource. The quality of the digital resource can be determined based on a resolution of the digital resource, a size of the digital resource, a machine-learned determination (e.g., an output of a machine-learned model that has processed data associated with the digital resource), and/or a determined uniqueness of the digital resource. Additionally or alternatively, the determined quality of the digital resource may be used to control how; or whether, further actions are taken. For example, one or more actions may occur in response to at least a threshold quality level. The determination of quality of the digital resource may be used to control or prevent low quality digital resources from being used, or to control the manner in which lower quality digital resources are handled or managed.

Alternatively and/or additionally, the systems and methods can leverage standard data to identify token data in a blockchain code. For example, the systems and methods can include obtaining blockchain data. The blockchain data can include byte code associated with a blockchain. The blockchain data can be processed to determine a subset of the blockchain data includes candidate token data. The candidate token data can be associated with a blockchain trigger event. The systems and methods can include obtaining standard data. In some implementations, the standard data can include one or more standards associated with standards for a non-fungible token. The candidate token data can be processed to determine the candidate token data is associated with the one or more standards. Identification data can be generated based on the candidate token data being associated with the one or more standards. In some implementations, the identification data can be descriptive of the candidate token data being associated with the non-fungible token. The identification data can be provided as output.

The systems and methods can obtain blockchain data. The blockchain data can include byte code associated with a blockchain. The blockchain data can be associated with a plurality of smart contracts. The plurality of smart contracts may include a plurality of if-then logic sets.

In some implementations, obtaining the blockchain data can include obtaining first node data from a blockchain node. The blockchain node can be associated with a particular blockchain. Obtaining the blockchain data can further include processing the first node data in a sandbox (e.g., an isolated computer environment to mitigate the spread of any potential unexpected consequences (e.g., a computer bug)) to generate a first portion of the blockchain data and storing the first portion of the blockchain data.

Additionally and/or alternatively, obtaining the blockchain data can include obtaining second node data from the blockchain node. The blockchain node can be associated with the particular blockchain. In some implementations, obtaining the blockchain data can further include processing the second node data in the sandbox to generate a second portion of the blockchain data and storing the second portion of the blockchain data.

The blockchain data can be processed to determine a subset of the blockchain data includes candidate token data. In some implementations, the candidate token data can be associated with a blockchain trigger event. The blockchain trigger event can include an if-then event such that if a certain event occurs, a digital resource can have a transfer in ownership. The candidate token data may be determined based on the detection of a blockchain trigger event in the byte code of the blockchain.

The systems and methods can obtain standard data. The standard data can include one or more standards associated with standards for a non-fungible token. The standards can be associated with predetermined interfaces for uniform interfacing with different non-fungible tokens. The smart contract structure can conform to the standards to enable a standard application programming interface to facilitate interactions with different non-fungible tokens (e.g., regardless of the particular publisher).

The candidate token data can be processed to determine the candidate token data is associated with the one or more standards. The determination can include searching the candidate token data to determine whether one of the predetermined interfaces is included in the candidate token data. In some implementations, the candidate token data can be processed to identify whether a particular blockchain trigger event language (e.g., a function signature, which may include a particular string matching one of the predefined string templates for non-fungible tokens as indicated by the one or more standards) is included in the candidate token data.

Identification data can be generated based on the candidate token data being associated with the one or more standards. The identification data can be descriptive of the candidate token data being associated with the non-fungible token.

The identification data can be provided as output. The identification data can be provided to a user computing system. In some implementations, the identification data can be provided to an indexing computing system to instruct the index computing system whether to index the candidate token data. For example, if the identification data is descriptive of the candidate token data being associated with a non-fungible token, the candidate token data may be indexed. Alternatively and/or additionally, if the identification data is descriptive of the candidate token data not being associated with a non-fungible token, the candidate token data may not be indexed. The candidate token data determined to be associated with a non-fungible token can be identified token data that can be stored for indexing and/or for other purposes (e.g., for machine-learning training to training one or more models to detect and identify token data associated with non-fungible token(s)).

Index data can then be generated based on the candidate token data and the identification data. The identification data can be utilized to determine whether, and/or at what extent, to index the candidate token data. In some implementations, data descriptive of the identification data can be indexed with other data associated with the candidate token data.

In some implementations, the blockchain trigger event can be processed to determine a digital asset associated with the non-fungible token. The digital asset can be processed to determine the digital asset is vulgar, and the systems and methods can determine whether to index the candidate token data based at least in part on the identification data and the digital asset being vulgar.

Alternatively and/or additionally, the token data may be identified based on a determined intent. For example, the systems and methods can include obtaining blockchain data. The blockchain data can include byte code associated with a blockchain. The blockchain data can be processed to determine a subset of the blockchain data includes candidate token data. In some implementations, the candidate token data can be associated with a blockchain trigger event. The candidate token data can be processed to determine an intent associated with the candidate token data. The candidate token data can include reference data associated with a digital resource. The intent can be processed to determine the candidate token data is descriptive of a non-fungible token. In some implementations, identification data can be provided as an output. The identification data can be descriptive of the candidate token data being associated with the non-fungible token.

The systems and methods can obtain blockchain data. The blockchain data can include byte code associated with a blockchain. The blockchain data may be obtained from a blockchain node. Alternatively and/or additionally, the blockchain data may be obtained from a non-blockchain repository.

The blockchain data can be processed to determine a subset of the blockchain data includes candidate token data. The candidate token data can be associated with a blockchain trigger event. In some implementations, the candidate token data can include data descriptive of a smart contract. The blockchain trigger event can be an event that triggers the transfer of a payload of a smart contract.

The candidate token data can be processed to determine an intent associated with the candidate token data. The candidate token data can include reference data associated with a digital resource. In some implementations, the intent can be determined based at least in part on the blockchain trigger event. Alternatively and/or additionally, the intent can be determined based at least in part on freeform text in the candidate blockchain data. The intent can be a minting intent to publish the non-fungible token on the blockchain. In some implementations, the intent can be determined by processing the candidate token data with a machine-learned model. The machine-learned model can be trained to determine whether the candidate token data is descriptive of script data structured to provide a non-fungible token functionality.

The intent can be processed to determine the candidate token data is descriptive of a non-fungible token. For example, the intent can be processed to determine whether the intent meets a threshold likelihood of being a non-fungible token intent.

The systems and methods can provide identification data as an output. The identification data can be descriptive of the candidate token data being associated with the non-fungible token. The identification data can be generated based at least in part on the determination that the intent is a non-fungible-token intent.

In some implementations, the systems and methods disclosed herein can identify non-fungible token data based on whether the actions associated with a smart contract match (e.g., are the same or similar to) the actions of how a non-fungible token would act. For example, the smart contract may include a "get URI" that can include an application programming interface for pulling a uniform resource identifier. Additionally and/or alternatively, the smart contract may include similar structure to one or more EIP-721 standards (*EIP-721: Non-Fungible Token Standard*, ETHEREUM IMPROVEMENT PROPOSALS (Jan. 24, 2018), https://eips.ethereum.org/EIPS/eip-721). Alternatively and/or additionally, the blockchain can be crawled to identify payloads that may match (e.g., be the same as or substantially similar to) a digital asset of a non-fungible token. The systems and methods may identify token data sets even if the dataset includes deviations from the one or more standards.

Additionally and/or alternatively, the systems and methods can include one or more pre-filtering techniques. For example, the systems and methods can include filtering out any dataset associated with a suspicious address, a suspicious embedding, and/or a suspicious actor (e.g., an unknown publisher or an owner/publisher with an association to past scam-related non-fungible tokens), thereby improving security.

In some implementations, the identified token data can be further processed to determine whether and/or how to index the identified token data. For example, the systems and methods can process the candidate token data to determine whether the token data is suspicious, potentially includes a bug, and/or includes a low quality digital asset. For example, if token data is determined to potentially include a bug and/or a low quality digital asset, the token data may not be indexed, or may be flagged for further checks or processing.

The token data may be determined to be suspicious based on an embedded uniform resource identifier and/or an embedded uniform resource locator. Alternatively and/or additionally, the token data may be determined to be suspicious based on the transaction data for the non-fungible token (e.g., suspicious strings of transactions, suspicious actors in the transactions, suspicious context surrounding the minting, etc.).

Determining the potential of a bug can be based on heuristics and/or machine-learned techniques (e.g., the processing of the token data with a machine-learned model).

A low quality digital resource (e.g., a low quality digital asset) can be a digital asset with little to no distinguishing features (e.g., a white noise audio clip or a digital asset that is the same or substantially similar to a plurality of other digital assets or media files that pre-date the date of minting). Alternatively and/or additionally, a low quality digital asset can be a digital asset with poor resolution, heavy pixelation, heavy noise, file errors, and/or small in relative size to other non-fungible token digital assets of the same type or class. In some implementations, a low quality digital asset can be a digital asset with vulgar and/or offensive content. For example, the systems and methods may obtain the digital asset associated with the token data. The digital asset can be processed to determine whether the digital asset includes vulgar and/or offensive material. If the digital asset is determined to include vulgar and/or offensive content, the respective token data may be flagged and/or tagged. The systems and methods can determine not to index the token data based on the tag and/or may index the token data with a tag indicating the vulgar and/or offensive nature of the digital asset. The tag can then be utilized to limit the surfacing of the indexed data for only a subset of users (e.g., users that allow the surfacing of vulgar and/or offensive content).

Alternatively and/or additionally, the quality of the non-fungible token may be determined based on how compliant the token data is with EIP and ERC standards for non-fungible tokens. The compliance may be weighted based on which standards are met and which standards the token data is deficient. In some implementations, the quality can be based on whether the uniform resource identifier can be used to navigate to the digital asset without edits.

In some implementations, the name and/or description associated with the token data can be processed to determine whether the name and/or description meet certain naming patterns or description patterns.

In some implementations, token data can be identified as being associated with a particular non-fungible token grouping (e.g., a particular community) based on a determined artist name, a determined publisher, and/or by metadata associated with the non-fungible token. The grouping may be determined based on minting date, an association with an event, and/or based on the transaction history of the purchasers.

Alternatively and/or additionally, the token data may be identified by processing the blockchain data and identifying a method signature. The method signature can be associated with the first four bytes of a hash. In some implementations, the method signature can be associated with a set uniform resource identifier with two parameters. The first parameter can include a token ID for the particular non-fungible token, and the second parameter can include a string of data.

The systems and methods disclosed herein can crawl the blockchain by utilizing a peer to peer node running on one or more computing devices. The systems and methods can passively "listen" and then dump any new data into a log to be later processed. Alternatively and/or additionally, the systems and methods may involve "live watching" of the node at intervals (e.g., a manually set interval, a predetermined interval, and/or an automatically determined interval). The systems and methods can crawl the blockchain to determine if any changes have occurred and any change may be identified and added to the log. In some implementations, the systems and methods may leverage application programming interfaces to identify and obtain new data.

In some implementations, the systems and methods can utilize non-blockchain repositories to obtain blockchain data. For example, a third party application programming interface may obtain and store the blockchain data in a non-blockchain repository, which can be accessed by the systems and methods to obtain the blockchain data for processing.

When crawling the blockchain and/or when crawling the web, the systems and methods may search for a contract address and a token ID to identify token data. Additionally and/or alternatively, the systems and methods may crawl the web to identify non-fungible token drop events and/or lazy minting events. The systems and methods may monitor messaging applications and/or social media platforms to obtain data on potential minting events.

The obtaining and processing of the blockchain data from the blockchain node can include one or more security techniques for mitigating the possibility of corrupting data due to opening or processing a bug or computer virus. For example, the blockchain data can be obtained and stored in a sandbox. The data can be processed in the sandbox before indexing to ensure bugs and/or viruses do not affect the index database.

In some implementations, the systems and methods can include customized blockchain nodes for different tasks. For example, a plurality of blockchain nodes can be configured to obtain and filter blockchain data for a plurality of different purposes. One node may filter the blockchain data to obtain and process transactional data, while another node may filter the blockchain data to obtain and process newly minted non-fungible tokens. Additionally and/or alternatively, different nodes may be configured to identify and obtain data associated with different non-fungible token types. For example, one node may be configured to identify and obtain token data for non-fungible tokens associated with images, while another node may be configured to identify and obtain token data for non-fungible tokens associated with domains. The plurality of nodes may be associated with different blockchains and/or may be associated with filtering based on different identification techniques. For example, a first node may obtain blockchain data to identify token data based on the identification of a digital asset payload, a second node may obtain data to be processed to determine token data based on naming patterns, and a third node may obtain blockchain data to process to determine token data based on one or more non-fungible token standards.

In some implementations, the systems and methods may probe blockchains by sending beacon transactions to gauge and/or track network health, along with potentially tracking other data characteristics. The probing can be utilized in updating "data fetch" strategies, or approaches. For example, if a beacon transaction is taking a longer time to process for a given amount of gas, the systems and methods may leverage more complex, dynamic fetching strategies, which may back off until transaction rates tick back up. The adjustment can help to potentially lower the cost of obtaining the "latest" data from a blockchain.

The systems and methods of the present disclosure provide a number of technical effects and benefits. As one example, the system and methods can provide systems and methods for identifying token data associated with one or more non-fungible tokens. For example, the systems and methods disclosed herein can process blockchain data to identify a plurality of candidate token data sets, which can be further processed to determine one or more token data sets. The one or more token data sets can then be indexed to generate a non-fungible token index database.

Another technical benefit of the systems and methods of the present disclosure is the ability to leverage a quality determination system to determine whether to index a token data set. For example, the systems and methods disclosed herein can process token data to determine whether the token data is potentially suspicious, potentially includes malicious data, is associated with a low resolution digital resource, includes vulgar data, includes offensive data, and/or is associated with a digital resource with little to no differentiating value. The quality can then be utilized to determine whether to index the token data. In some implementations, the quality filtering can be used to ensure low quality and potentially harmful data is not indexed for future surfacing.

Another example of technical effect and benefit relates to improved computational efficiency and improvements in the functioning of a computing system. For example, the systems and methods disclosed herein can leverage the token data identification to greatly reduce the computational power needed to index, search, and surface non-fungible token data. Additionally, the systems and methods disclosed herein can reduce the computational power utilized for generating the index database by filtering the blockchain data to identify token data sets within the blockchain data.

With reference now to the Figures, example embodiments of the present disclosure will be discussed in further detail.

Example Devices and Systems

FIG. 1A depicts a block diagram of an example computing system 100 that performs token data identification and non-fungible token indexing according to example embodiments of the present disclosure. The system 100 includes a user computing system 130, a server computing system 110, a creator computing system 150, and a blockchain computing system 170 that are communicatively coupled over a network 180.

The user computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the user computing system 130 to perform operations.

The user computing system 130 can also include one or more user input components that receive user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 110 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 118 and instructions 116 which are executed by the processor 112 to cause the server computing system 110 to perform operations.

In some implementations, the server computing system 110 includes or is otherwise implemented by one or more server computing devices. In instances in which the server computing system 110 includes plural server computing devices, such server computing devices can operate according to sequential computing architectures, parallel computing architectures, or some combination thereof.

The blockchain computing system 170 includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the blockchain computing system 170 to perform operations. In some implementations, the blockchain computing system 170 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 100 can include a number of applications (e.g., applications 1 through N). Each application can be in communication with a central intelligence layer. Example applications can include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can communicate with a central device data layer. The central device data layer can be a centralized repository of data for the computing system 100. In some implementations, the central device data layer can communicate with a number of other components of the computing device, such as, for example, one or more sensors, a context manager, a device state component, and/or additional components. In some implementations, the central device data layer can communicate with each device component using an API (e.g., a private API).

Additionally and/or alternatively, FIG. 1A depicts an exemplary computing system 100 that can be used to implement token data identification and indexing according to aspects of the present disclosure. The system 100 has a user-server architecture that includes a server 110 that communicates with one or more user computing systems 130 over a network 180. However, the present disclosure can be implemented using other suitable architectures, which can include any number of computing systems communicating over a network 180.

The system 100 includes a server 110, such as, for example, a web server. The server 110 can be one or more computing devices that are implemented as a parallel computing system and/or a distributed computing system. In particular, multiple computing devices can act together as a single server 110. The server 110 can have one or more processor(s) 112 and a memory 114. The server 110 can also include a network interface used to communicate with one or more remote computing devices (e.g., user devices) 130 over a network 180.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement index adjustment (e.g., index deduplication). The user profile database 120 can be configured to store a plurality of user profiles associated with a plurality of users utilizing one or more user computing systems 130. In some implementations, the user profile database 120 can be configured to be utilized for facilitating one or more interactions. The facilitation of the one or more interactions can involve the use of a blockchain application programming interface (API) 122 to send data to and receive data from a blockchain computing system 170. For example, a server computing system 110 can utilize the blockchain API 122 to update one or more ledgers 172 of the blockchain computing system 170. The one or more ledgers 172 can be associated with one or more tokens 174. The one or more tokens 174 can include one or more non-fungible tokens, which can include scripts associated with a digital asset (e.g., image data, video data, text data, latent encoding data, domain data, audio data, augmented-reality asset rendering data, and/or virtual-reality asset rendering data). In particular, the script can reference a specific digital asset that is provided for sale. The digital asset can include image data, text data, video data, latent encoding data, a domain name, a virtual property, an augmented-reality asset, a virtual-reality asset (e.g., a virtual-reality environment and/or a virtual-reality object for interaction in an environment), a smart contract, a physical item authentication, etc. In some implementations, the one or more ledgers 172 can be associated with cryptocurrency that can be utilized to make transactions in a physical marketplace and/or a virtual marketplace.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 118 that can be retrieved, manipulated, created, or stored by processor(s) 112. The data 118 can include search result data, ranking data, image data (e.g., digital maps, satellite images, aerial photographs, street-level photographs, synthetic models, paintings, personal images, portraits, etc.), video data, audio data, text data (e.g., books, articles, blogs, poems, etc.), latent encoding data, blockchain address data, tables, vector data (e.g., vector representations of roads, parcels, buildings, etc.), point of interest data (e.g., locales such as islands, cities, restaurants, hospitals, parks, hotels, and schools), or other data or related information. As an example, the data 118 can be used to access information and data associated with a specific digital asset, website, search result, blockchain, etc.

The data 118 can be stored in one or more databases. The one or more databases can be connected to the server 110 by a high bandwidth LAN or WAN, or can also be connected to server 110 through network 180. The one or more databases can be split up so that they are located in multiple locales.

The server 110 can exchange data with one or more user computing systems 130 over the network 180. Although two user computing systems 130 are illustrated in FIG. 1A, any number of user computing systems 130 can be connected to the server 110 over the network 180. The user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, the user computing system 130 can be multiple computing devices acting together to perform operations or computing actions.

Similar to server 110, a user computing system 130 can include a processor(s) 132 and a memory 134. The memory 134 can store information accessible by processor(s) 132, including instructions that can be executed by processor(s) and data. As an example, memory 134 can store data 136 and instructions 138.

Instructions 138 can provide instructions for implementing a browser, a non-fungible token purchase, and/or a plurality of other functions. In particular, the user of user computing system 130 can exchange data with server 110 by using the browser to visit a website accessible at a particular web-address. The token data identification and non-fungible token indexing of the present disclosure can be provided as an element of a user interface of a website and/or application.

The data 136 can include data related to running a specialized application on the user computing system 130. In particular, the specialized application can be used to exchange data with server 110 over the network 160. The data 136 can include user-device-readable code for providing and implementing aspects of the present disclosure. Additionally and/or alternatively, the data 136 can include data related to previously inputted or received data. For example, the data 136 can include data related to past occurrences of the special application.

The user computing system 130 can include various user input devices for receiving information from a user, such as a touch screen, touch pad, data entry key's, speakers, mouse, motion sensor, and/or a microphone suitable for voice recognition. Further, the user computing system 130 can have a display for presenting information, such as a user interface, displaying a digital asset, displaying pop-ups or application elements displayed in an interface, and/or other forms of information.

The user computing system 130) can also include a user profile 140 that can be used to identify a user of the user computing system 130. The user profile 140 can be optionally used by the user to make one or more transactions which can then be recorded on one or more ledgers 172 of the blockchain computing system 170. The user profile 140 can be descriptive of user information, which can include identification numbers and/or payment account information. For example, the user profile 140 can include data associated with a crypto wallet, which may be linked to a browser application via an application extension and/or embedding.

The user computing system 130 can further include a graphics processing unit. Graphics processing unit can be used by processor 132 to index adjustment. In some embodiments, the user computing system 130 performs any and all index adjustment.

The user computing system 130 can include a network interface for communicating with a server 110 over a network 180. Network interface can include any components or configuration suitable for communication with server 110 over network 180, including, for example, one or more ports, transmitters, wireless cards, controllers, physical layer components, or other items for communication according to any currently known or future developed communications protocol or technology.

The network 180 can be any type of communications network, such as a local area network (e.g., intranet), wide area network (e.g., Internet), or some combination thereof. The network 180 can also include a direct connection between a client device 130 and the server 110. In general, communication between the server 110 and a client device 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the exemplary computing system 100 can include one or more creator computing systems 150. The one or more creator computing systems 150 can be utilized for generating images, videos, prose, poetry, audio, etc., which can then be provided for sale. The one or more creator computing systems 150 can include one or more processors 152, which can be utilized to execute one or more operations to implement the systems and methods disclosed herein. The one or more creator computing systems 150 can include one or more memory components 154, which can be utilized to store data 156 and one or more instructions 158. The data 156 can include data related to one or more applications, one or more media datasets, etc. The instructions 158 can include one or more operations for implementing the systems and methods disclosed herein.

The one or more creator computing systems 150 can store data associated with one or more digital assets 160 and/or one or more creator profiles 162. The one or more digital assets 160 can include text data, image data, video data, audio data, latent encoding data, domain data, or a variety of other data formats. The one or more creator profiles 162 can include information associated with one or more "creators" of the one or more digital assets 160. The one or more creator profiles 162 can include identification data, transaction data, and/or crypto wallet data.

Additionally and/or alternatively, the exemplary computing system 100 can include one or more blockchain computing systems 170. The one or more blockchain computing systems 170 can include a plurality of computing devices being utilized for decentralized data storage, such that a plurality of "blocks" can be distributed throughout a network of computing devices to provide a secure system for data storage, which can include one or more ledgers 172 and one or more tokens 174. In some implementations, each of the one or more tokens 174 can be associated with at least a portion of the one or more ledgers 172.

Blockchain can refer to a system configured to securely record information. The blockchain can include a decentralized system that can render changing information extremely difficult. The blockchain can include a digital ledger of transactions that can be duplicated and distributed across a network of computing systems. Each block in the chain can include a number of transactions. When a new transaction occurs on the blockchain, a record of that transaction can be added to every computing device's ledger. The blockchain can be utilized to track the exchange of currency and/or digital assets via the recording of transactions on the digital ledger, which can be propagated throughout the decentralized system. The currency exchanged and tracked via the blockchain computing system 170) can be referred to as cryptocurrency.

The tokens 174 can include one or more non-fungible tokens. The non-fungible tokens can be minted on a blockchain associated with the blockchain computing system 170. A non-fungible token (NFT) can be a certificate of authenticity of a digital asset. NFTs can be non-interchangeable thus making their worth depend on the price anyone may be willing to pay for the asset. NFTs can be printed on blockchains such that their scarcity and authenticity can be maintained. A digital asset can be defined as anything that is stored digitally and can be uniquely identifiable that organizations can use to realize value. Examples of digital assets can include a tweet, a social media comment, documents, audio, images, videos, logos, website domains, slide presentations, spreadsheets, CSS files and formats, executable code, and/or websites.

Figure 1B:
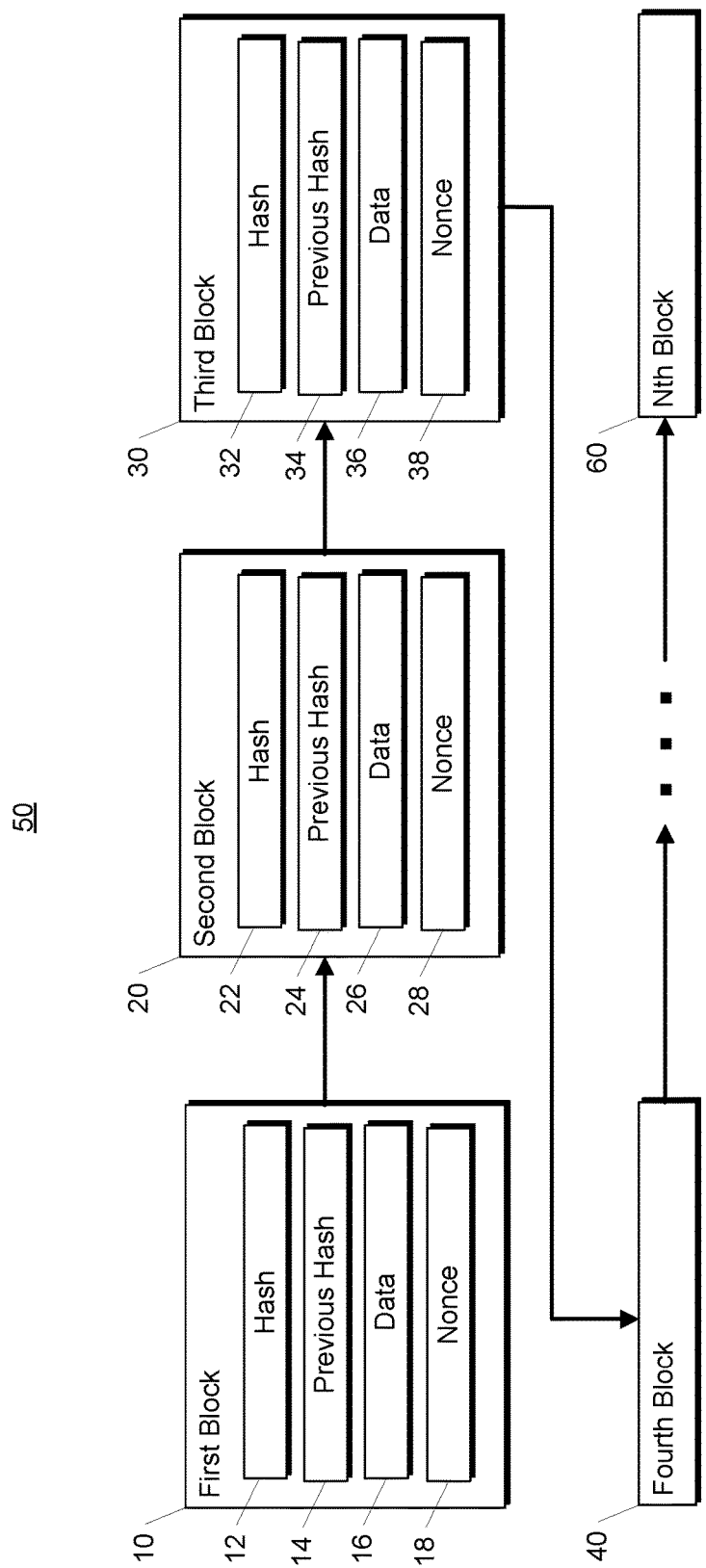
FIG. 1B depicts a block diagram of an example computing device that performs token data identification and non-fungible token indexing according to example embodiments of the present disclosure.

FIG. 1B depicts a block diagram of an example blockchain 50 that may be utilized by the blockchain computing system 170 of the exemplary computing system 100 of FIG. 1A. The example blockchain 50 can include a plurality of blocks that can be utilized to store data with one or more cryptographic features. The blockchain 50 can be stored on a decentralized computing system comprising a plurality of computing devices. The blockchain 50 can be a public blockchain (e.g., a blockchain that is open without access restrictions such that anyone with an internet access can send transactions or validate transactions as part of the decentralized, distributed system), a private blockchain (e.g., a blockchain that provides access based on permissions set by network administrators), or a hybrid blockchain (e.g., a blockchain with a combination of blocks with no restrictions and blocks with restrictions). The blockchain 50 can include proof of work features that can include one or more cryptographic forms of proof. The proof of work can be provided upon a request to update the blockchain 50 (e.g., a request to update the ledgers based on a new transaction). The proof of work can convey that a certain device or group of devices have performed a certain amount of computation, which can then be validated by other parties. Once validated, the blockchain 50 can be updated, or may remain unchanged in response to a failure to validate. The proof of work feature can be utilized to mitigate the computational cost of every device in the system having to perform the same computational functions and checks for determining a request is valid for updating the blockchain 50.

Each block can include a hash, a previous hash associated with the hash of the previous block, and data. In some implementations, each block can include a nonce. A hash can be a hash value of a fixed length that can be a fingerprint for the particular block. The hash value can be generated based on a hash function and may be changed each time a change is made to the data of that particular block. The previous hash can include a hash value of the block immediately preceding the particular block. The previous hash can be utilized to ensure the downstream ground truth stays unchanged unless proper validation occurs. The data can include transaction data (e.g., a transaction ledger), a timestamp, a value associated with a cryptocurrency value, a non-fungible token (e.g., a non-fungible token including a script that references a digital asset, nonce data, and/or general blockchain data. Nonce (i.e., a number only used once) can be a number added to a block in a blockchain that can meet a difficulty level restriction when a block is rehashed. The nonce can be a number that blockchain miners are solving for, in order to receive an incentive (e.g., cryptocurrency).

The blockchain 50) can include one or more security protocols and/or features. The blockchain 50 can include a cryptographic system. For example, the blockchain 50 can validate the blockchain 50 is valid by ensuring the stored previous hash stored in the block matches the hash value of the previous block from the last block back to the first block (e.g., the genesis block). In some implementations, the blockchain 50 can include proof of work validation that can rely on verifying proof of computation before implementing a change to the stored data (e.g., the stored ledger). Proof of work validation can take seconds, minutes, and/or hours based in part on the number of blocks in the blockchain 50. Additionally and/or alternatively, the blockchain 50 can be implemented on a distributed, decentralized computing system. In some implementations, each computing device in the distributed, decentralized computing system can store a portion of (e.g., a block of the plurality of blocks) or all of the blocks in the blockchain 50. Therefore, the system can verify data by ensuring the data is uniform across most, if not all, of the distributed system. Each node of the distributed system can be checked for tampering before adding new data.

The data can include data associated with a cryptocurrency value (e.g., a ledger associated with a specific cryptocurrency value), data associated with a digital asset (e.g., a non-fungible token minted on the blockchain 50 that can include a script associated with the digital asset), data associated with a smart contract (e.g., a smart contract that includes conditions that automatically initiates an action in response to a criteria being met), and/or timestamp data (e.g., timestamp data for block creation, minting, a transaction, etc.).

In particular, FIG. 1B depicts a first block 10, a second block 20, a third block 30, a fourth block 40, and an nth block 60. Although five blocks are depicted, any number of blocks can be utilized. The first block 10 can be a genesis block (e.g., a first overall block in the blockchain). The first block 10 can include a respective first hash 12 (e.g., a hash value associated with the first block 10). The first block 10 may include a first previous hash 14 (e.g., if the first block 10 has a block before it in the blockchain 50, then the hash of the previous block can be stored on the first block 10). Additionally and/or alternatively, the first block 10 can include data 16 and nonce 18.

The second block 20 can follow the first block 10. The second block 20 can include a respective second hash 22 (e.g., a hash value associated with the second block 20). The second block 20 may include a second previous hash 24 (e.g., the second previous hash 24 can be the same as, or reference, the first hash 12). Additionally and/or alternatively, the second block 20 can include data 26 and nonce 28.

The third block 30 can follow the second block 20. The third block 30 can include a respective third hash 32 (e.g., a hash value associated with the third block 30). The third block 30 may include a third previous hash 34 (e.g., the third previous hash 34 can be the same as, or reference, the second hash 22). Additionally and/or alternatively, the third block 30 can include data 36 and nonce 38.

Additionally and/or alternatively, the fourth block 40, the nth block 60, and other potential blocks can include a respective hash, a respective previous hash, and data. The first data 16, the second data 26, the third data 36, and the data of the other blocks can include overlapping data, can differ, and/or be the same such that the data is duplicative for all blocks. In some implementations, each block can be associated with a different transaction (e.g., a different minting, a different sale, etc.). The first nonce 18, the second nonce 28, the third nonce 38, and the nonce's of the other blocks can differ and may be solved during mining.

The data in each block can include ledger data, which can include a timestamp, asset and/or cryptocurrency exchanged, actors involved in transaction, and/or a variety of other information.

In some implementations, a plurality of different blockchains can be utilized for the systems and methods disclosed herein. The different blockchains can include different configurations. The different blockchains can include parallel chains, side chains, shared blocks, differing chains, varying permissions, varying purposes, varying number of blocks, and/or varying hash functions and/or varying hashing value lengths.

In some implementations, the systems and methods can include one or more machine-learned model computing systems 900. The one or more machine-learned models can be utilized for a variety of tasks for enabling token data identification, indexing, and deduplication.

Figure 9A:
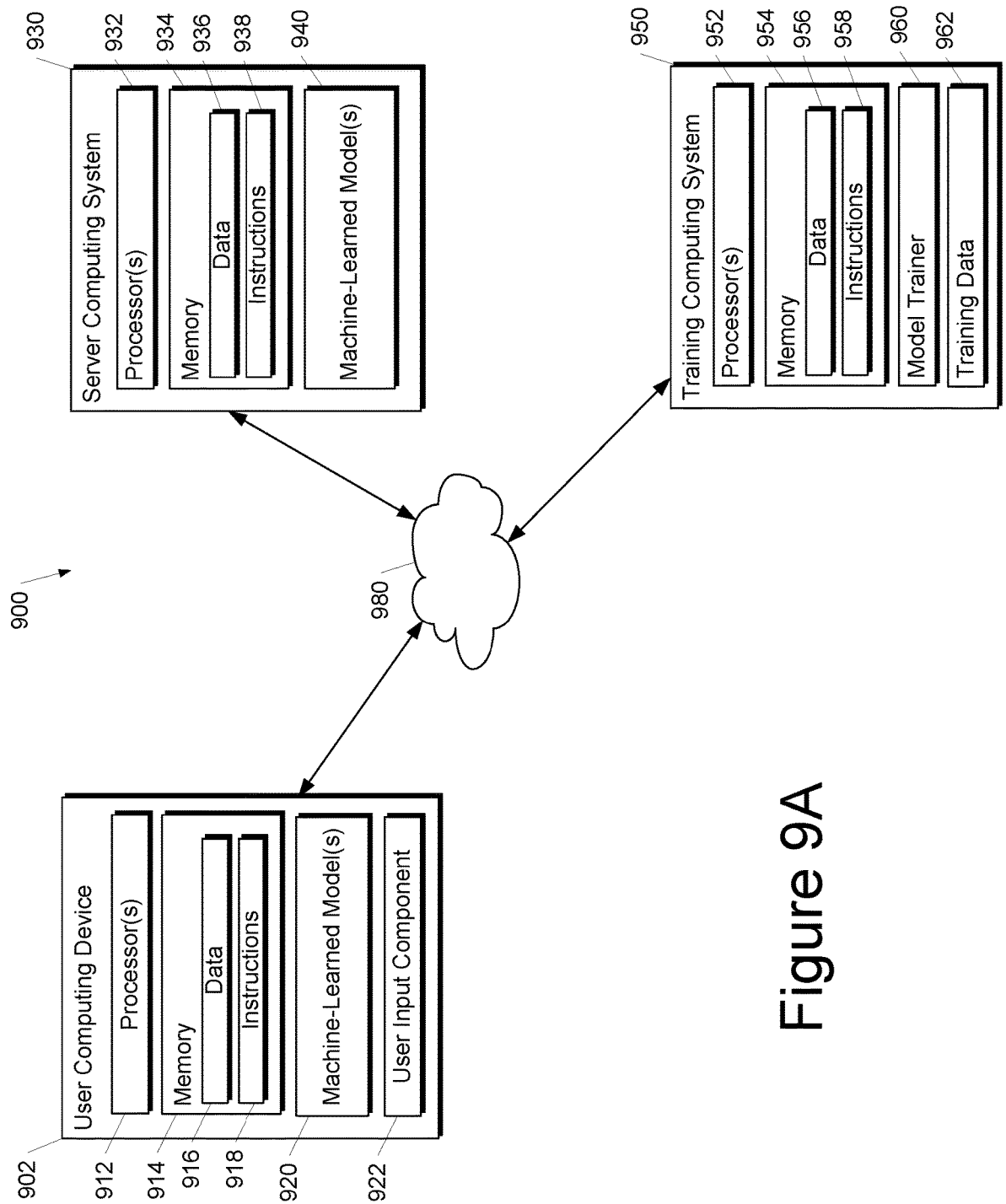
FIG. 9A depicts a block diagram of an example computing system that performs token data identification and indexing according to example embodiments of the present disclosure.

FIG. 9A depicts a block diagram of an example computing system 900 that performs token data identification, indexing, and deduplication according to example embodiments of the present disclosure. The system 900 includes a user computing device 902, a server computing system 930, and a training computing system 950 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more token indexing models 920. For example, the token indexing models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example token indexing models 920 are discussed with reference to FIGS. 2 & 11.

In some implementations, the one or more token indexing models 920 can be received from the server computing system 930 over network 980, stored in the user computing device memory 914, and then used or otherwise implemented by the one or more processors 912. In some implementations, the user computing device 902 can implement multiple parallel instances of a single token indexing model 920 (e.g., to perform parallel token data indexing across multiple instances of token data descriptive of a non-fungible token).

More particularly, the token indexing model can include one or more detection models, one or more segmentation models, one or more classification models, and/or one or more feature extractor models. The token indexing model can process blockchain data and/or web page data to generate index data descriptive of index information associated with one or more respective non-fungible tokens. In some implementations, the one or more token indexing models can include one or more token identification models. The one or more token identification models can process the blockchain data to identify token data that can then be indexed via one or more additional machine-learned models of the token indexing model.

Additionally or alternatively, one or more token indexing models 940 can be included in or otherwise stored and implemented by the server computing system 930 that communicates with the user computing device 902 according to a client-server relationship. For example, the token indexing models 940 can be implemented by the server computing system 940 as a portion of a web service (e.g., a token indexing service). Thus, one or more models 920 can be stored and implemented at the user computing device 902 and/or one or more models 940 can be stored and implemented at the server computing system 930.

The user computing device 902 can also include one or more user input components 922 that receive user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned token indexing models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIGS. 2 & 11.

The user computing device 902 and/or the server computing system 930 can train the models 920 and/or 940 via interaction with the training computing system 950 that is communicatively coupled over the network 980. The training computing system 950 can be separate from the server computing system 930 or can be a portion of the server computing system 930.

The training computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the training computing system 950 to perform operations. In some implementations, the training computing system 950 includes or is otherwise implemented by one or more server computing devices.

The training computing system 950 can include a model trainer 960 that trains the machine-learned models 920 and/or 940 stored at the user computing device 902 and/or the server computing system 930 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 960 can perform a number of generalization techniques (e.g., weight decays, dropouts, etc.) to improve the generalization capability of the models being trained.

In particular, the model trainer 960 can train the token indexing models 920 and/or 940 based on a set of training data 962. The training data 962 can include, for example, training blockchain data, training web page data, training transaction data, ground truth labels, ground truth index information, and/or ground truth segmentation masks.

In some implementations, if the user has provided consent, the training examples can be provided by the user computing device 902. Thus, in such implementations, the model 920 provided to the user computing device 902 can be trained by the training computing system 950 on user-specific data received from the user computing device 902. In some instances, this process can be referred to as personalizing the model.

The model trainer 960 includes computer logic utilized to provide desired functionality. The model trainer 960 can be implemented in hardware, firmware, and/or software controlling a general purpose processor. For example, in some implementations, the model trainer 960 includes program files stored on a storage device, loaded into a memory and executed by one or more processors. In other implementations, the model trainer 960 includes one or more sets of computer-executable instructions that are stored in a tangible computer-readable storage medium such as RAM hard disk or optical or magnetic media.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 9A illustrates one example computing system that can be used to implement the present disclosure. Other computing systems can be used as well. For example, in some implementations, the user computing device 902 can include the model trainer 960 and the training dataset 962. In such implementations, the models 920 can be both trained and used locally at the user computing device 902. In some of such implementations, the user computing device 902 can implement the model trainer 960 to personalize the models 920 based on user-specific data.

Figure 9B:
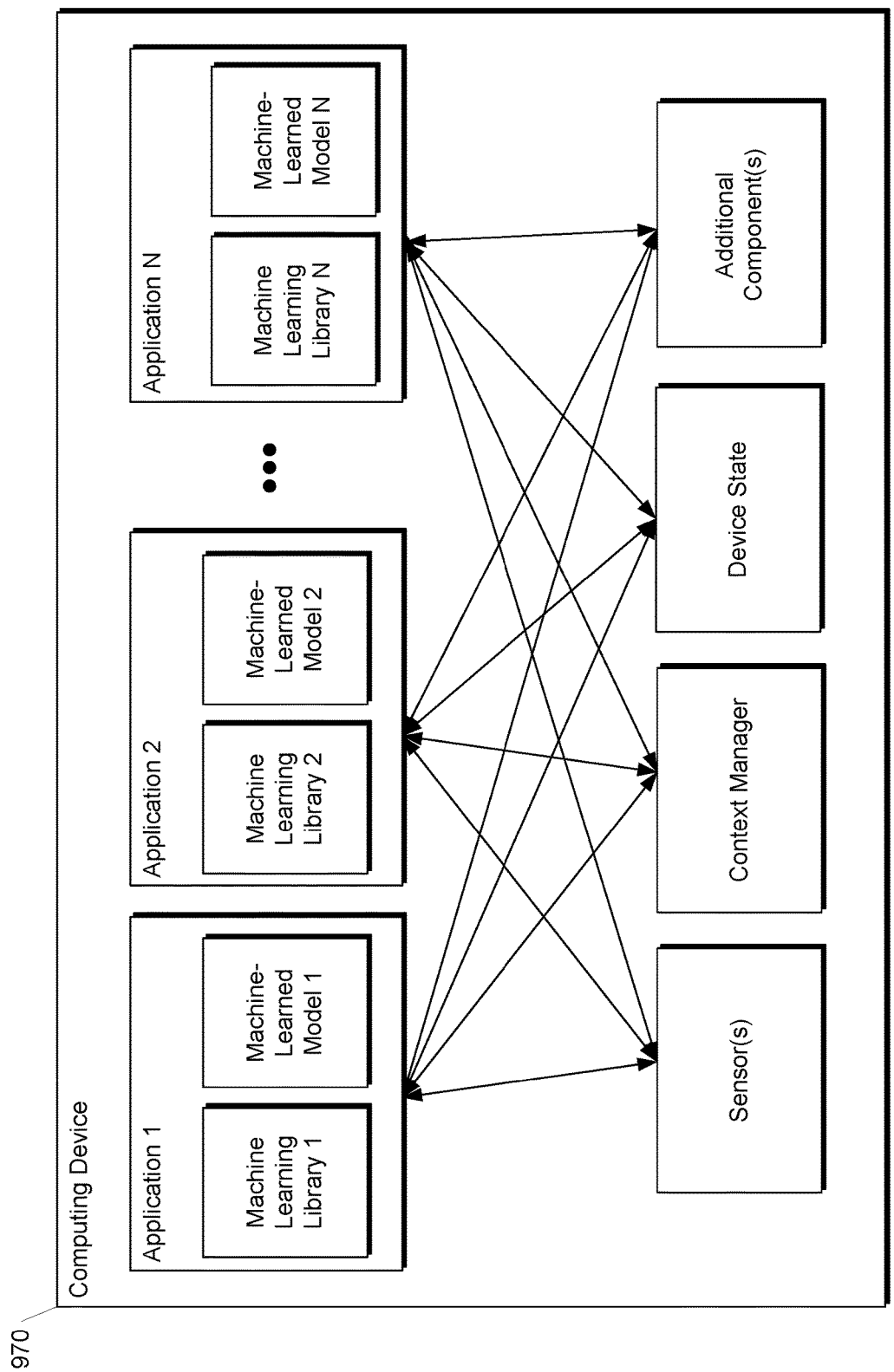
FIG. 9B depicts a block diagram of an example computing device that performs token data identification and indexing according to example embodiments of the present disclosure.

FIG. 9B depicts a block diagram of an example computing device 970 that performs according to example embodiments of the present disclosure. The computing device 970 can be a user computing device or a server computing device.

The computing device 970 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
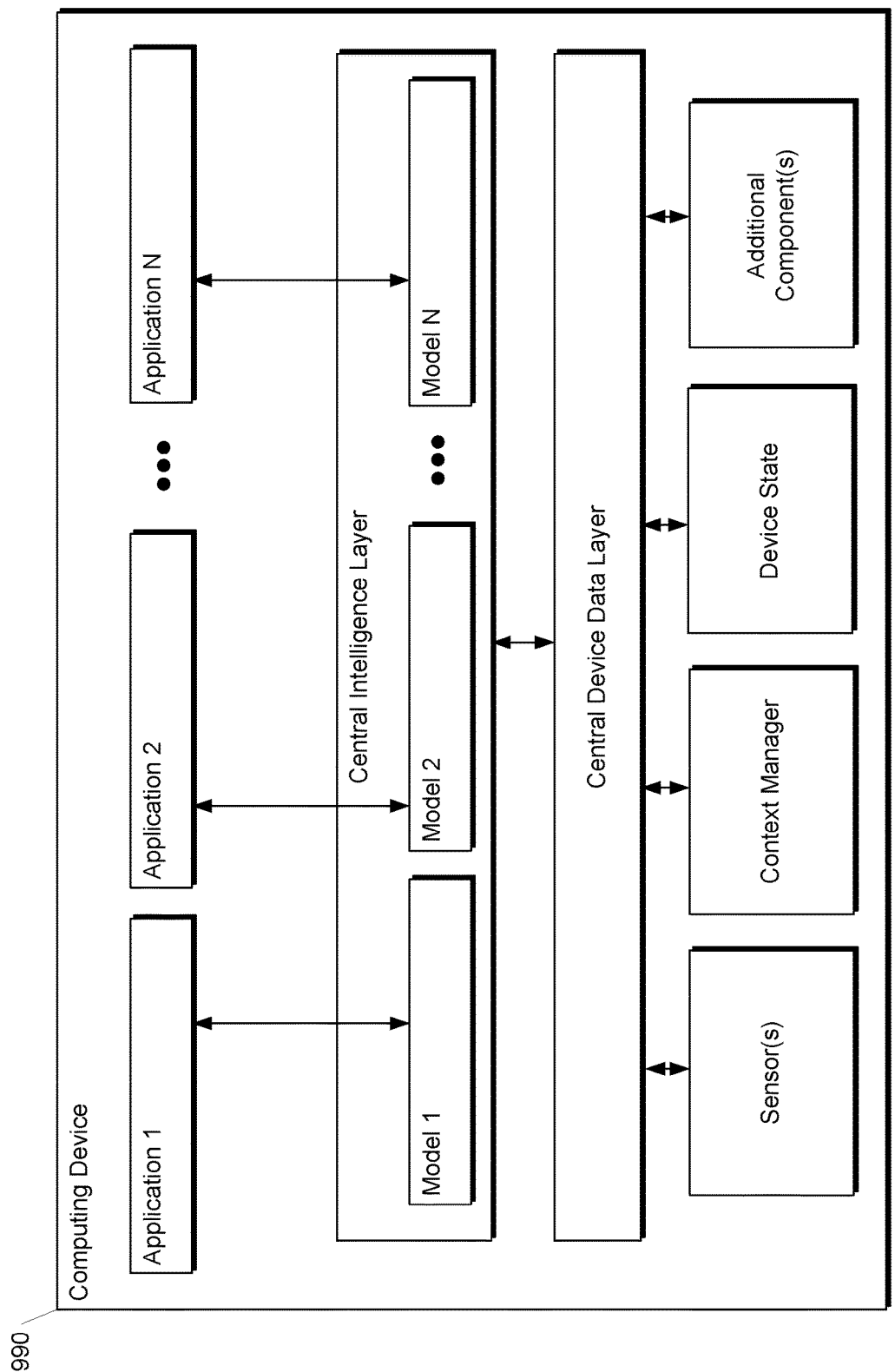
FIG. 9C depicts a block diagram of an example computing system that performs token data identification and indexing according to example embodiments of the present disclosure.

FIG. 9C depicts a block diagram of an example computing device 990 that performs according to example embodiments of the present disclosure. The computing device 990 can be a user computing device or a server computing device.

The computing device 990 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 990.

The central intelligence layer can communicate with a central device data layer. The central device data layer can be a centralized repository of data for the computing device 990. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

FIG. 2 depicts a block diagram of an example token identification system 1000 according to example embodiments of the present disclosure. In some implementations, the example token identification system 1000 can be configured to receive a blockchain data 1004 from a blockchain and/or a repository 1002 associated with a plurality of non-fungible tokens and, as a result of receipt of the blockchain data 1004, provide identification data 1014 that can be utilized to determine what data to index 1016. Thus, in some implementations, the token identification system 1000 can include an identification block (e.g., a machine-learned token identification model) that is operable to determine which subsets of data in the blockchain are associated with non-fungible tokens for indexing.

In particular, FIG. 2 depicts a block diagram of an example token data identification system 1000 according to example embodiments of the present disclosure. For example, the token data identification system 1000 can include accessing a blockchain and/or a repository 1002 in order to obtain blockchain data 1004. The blockchain can be accessed via a blockchain node. In some implementations, the blockchain and/or the repository 1002 can be accessed to obtain blockchain data 1004 via an application programming interface. The repository can be a repository that stores blockchain data 1004 outside of the blockchain computing system. The repository may be generated by a third party computing system using one or more third party application programming interfaces.

The blockchain data 1004 can include script data associated with a plurality of non-fungible tokens. The plurality of non-fungible tokens can be associated with a plurality of respective electronic ledgers. The blockchain data 1004 can be associated with a particular blockchain and/or a plurality of different blockchains. The blockchain data can include byte code data associated with a blockchain. Alternatively and/or additionally, the blockchain data can be associated with a leaf page of a web platform.

The blockchain data 1004 can be processed by one or more blocks to generate identification data 1014. The identification data 1014 can be descriptive of one or more identified token data sets. In some implementations, identifying the one or more token data sets can include processing the blockchain data with a machine-learned token identification model.

Processing the blockchain data 1004 to generate identification data 1014 can include determining one or more subsets of the blockchain data 1004 are descriptive of one or more token data sets that are associated with one or more non-fungible tokens. The determination can include parsing the blockchain data 1004. The parsing can be based on code semantics, data sub-structures, one or more code identifiers, and/or based on a plurality of other factors. Alternatively and/or additionally, the blockchain data 1004 can be processed to determine that one or more subsets of the blockchain data 1004 are associated with one or more blockchain trigger events 1006. The one or more subsets associated with the one or more blockchain trigger events 1006 can be determined to be candidate token data sets. The one or more blockchain trigger events 1006 can be associated with one or more smart contracts that comprise data descriptive of an if-then event that causes the transfer of a payload (e.g., a digital resource) in response to a transaction.

The one or more candidate token data sets can be further processed to determine whether the blockchain trigger event 1006 is associated with a non-fungible token. For example, the blockchain trigger 1006 event can be processed to determine an output action associated with the blockchain trigger event 1006. The output action can be processed to determine whether the output action is associated with a digital resource (e.g., a digital asset). If the output action is associated with a digital resource that is associated with a non-fungible token, the candidate token data may be identified as token data, which may then be indexed 1016.

Alternatively and/or additionally, the token data may be identified based on one or more standards 1008. The one or more standards 1008 can be standards associated with a uniform structure for non-fungible tokens (e.g., EIP standards and/or ERC standards). For example, the blockchain data 1004 can be crawled to search for one or more strings associated with one or more standard non-fungible token strings (e.g., strings associated with a uniform interface template and/or predetermined strings associated with a "function" and/or "event" portion of the script data). If a subset of the blockchain data meets a threshold standards level (e.g., the subset includes the uniform interface template and/or conforms to one or more standards), the subset can be determined to be token data, which can then be utilized to generate the identification data 1014.

In some implementations, the candidate token data and/or the identified token data can be processed to determine the quality 1010 of the non-fungible token associated with the token data. The quality 1010 can be determined based on heuristic data and/or based on output data of one or more machine-learned models. In some implementations, the quality 1010 of the non-fungible token can be based on a determined authenticity or validity of the non-fungible token (e.g., whether the non-fungible token is suspicious), based on whether the digital resource associated with the non-fungible token includes distinguishing features (e.g., the digital resource amounts to more than white noise or mere slight differences from previously minted digital resources), based on a level of vulgarity or offensiveness (e.g., the digital resource may be of higher quality if the digital resource provides family friendly content that does not include harmful language or imagery), and/or based on how closely the token data conforms to the one or more uniform standards for non-fungible tokens. The quality 1010 can be utilized to generate the identification data 1014. In some implementations, the quality 1014 may be utilized to determine whether to index 1016 the token data and/or how to index 1016 the token data (e.g., full indexing, partial indexing, index with a quality tag or label, and/or not index).

In some implementations, the blockchain data 1004 can be processed to determine other characteristics 1012 that may be utilized to generate the identification data 1014. The other characteristics 1014 can include data related to lazy minting, empty payloads, non-fungible token communities, pertinence of the non-fungible token, duplicate non-fungible tokens, type of digital resource (e.g., image, video, augmented-reality rendering asset, virtual-reality environment, audio, authentication certificate for physical object, domain, and/or virtual property), and/or recency of minting.

The identification data 1014 can be provided to an indexing computing system, which can determine which (if any) subsets of the blockchain data 1004 to index 1016. For example, identified token data of high quality (e.g., token data associated with a non-fungible token from a validated publisher including a high resolution digital asset as payload with no vulgarity) may be indexed 1016, while a data set with a low likelihood of being associated with a non-fungible token may not be indexed 1016.

The indexed data can then be stored in an index database which can be utilized for enabling a non-fungible token search platform.

FIG. 3 depicts a block diagram of an example index filtering system 1100 according to example embodiments of the present disclosure. In particular, the example index filtering system 1100 can process blockchain data 1102, determine token data 1106 in the blockchain data 1102, and determine whether to index 1110 the token data 1106. In some implementations, the index filtering system 1100 can include a plurality of machine-learned models (e.g., an identification model 1104 to determine subsets of the blockchain data 1102 associated with non-fungible tokens and/or a quality model 1108 to determine a quality of the identified subsets of data) to determine what and how to index 1110.

For example, blockchain data 1102 can be obtained from a blockchain node and/or a repository. The blockchain data 1102 can be associated with a blockchain. The blockchain data can be descriptive of byte code.

The blockchain data 1102 can be processed by an identification model 1104 to determine and/or generate token data 1106. The token data 1106 can be associated with a non-fungible token. In some implementations, the token data 1106 can be generated by identifying a token ID and/or a contract address. The identification model 1104 can detect token IDs and/or contract addresses and can then obtain portions of the blockchain data associated with the token ID and/or the contract address, which can then be processed (e.g., the data can be processed for aggregating and/or concatenating the data) in order to generate the token data 1106. Alternatively and/or additionally, the identification model 1104 can determine and/or generate the token data 1106 by processing the blockchain data 1104 to determine subsets of the blockchain data 1102 associated with at least one of a blockchain event, one or more uniform non-fungible token standards, and/or a given non-fungible token intent.

The token data 1106 can then be processed with a quality model 1108, which can then be utilized to determine whether to and/or how to index 1110 the token data. The quality model 1108 can process the token data 1106 to determine if the token data 1106 includes suspicious characteristics, potentially includes a bug, is associated with a high quality digital resource, and/or is vulgar or offensive. The quality model 1108 can generate a quality output (e.g., a quality metric), which can then be utilized to determine whether to index 1110 the token data 1108. In some implementations, token data sets with a threshold quality metric may be indexed 1110, while token data sets that do not meet the threshold may not be indexed and/or may be partially indexed. Alternatively and/or additionally, the quality metric, and/or one or more tags/labels associated with the quality metric, may be indexed with the token data 1106.

In some implementations, the determination on whether to index 1110 the token data 1106 may be based on a weighted score that can be based on identification data from the identification model 1104 and quality data from the quality model 1108.

The one or more machine-learned models can be trained on labeled training examples and/or may be trained based on labeled features. The one or more machine-learned models can include one or more classification models, one or more feature extractors, one or more detection models, one or more segmentations models, and/or one or more augmentation models. The one or more machine-learned models can be trained for natural language processing, computer vision, image processing, video processing, latent encoding processing, audio processing, and/or encoding/decoding.

Figure 4:
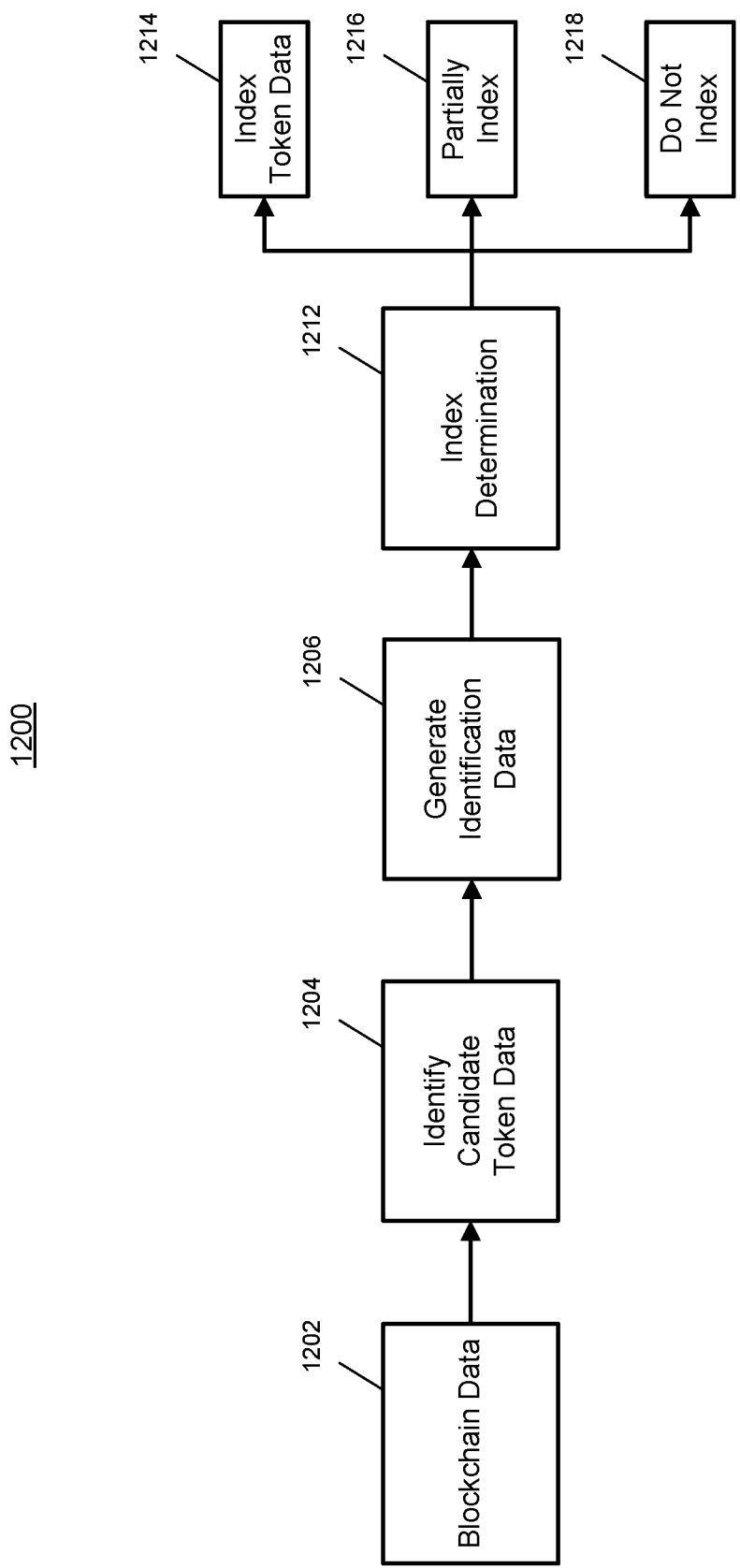
FIG. 4 depicts a block diagram of an example index determination system according to example embodiments of the present disclosure.

FIG. 4 depicts a block diagram of an example index determination system 1200 according to example embodiments of the present disclosure. In particular, the example index determination system 1200 can obtain blockchain data 1202, identify candidate token data 1204, generate identification data 1206 based on the identified candidate token data 1204, and generate an index determination 1212 based on the identification data. The index determination 1212 can include indexing the token data 1214, partially indexing 1216 the token data, or not indexing 1218 the token data.

For example, blockchain data 1202 can be obtained from a blockchain computing system. The blockchain data 1202 can include data descriptive of a plurality of non-fungible tokens associated with a plurality of digital resources. The blockchain data 1202 can be processed to identify candidate token data 1204 in the blockchain data. The identification can be based on determined blockchain trigger events, based on one or more uniform non-fungible token standards, based on a determined publisher intent, and/or based on a determined association with a digital resource (e.g., a digital asset).

The candidate token data can then be processed to generate identification data 1206. The identification data can be descriptive of the candidate token data being associated with a non-fungible token. The identification data may include an identification metric descriptive of a likelihood that the candidate token data is associated with a non-fungible token.

The identification data can then be processed to generate an index determination. The index determination 1212 can include data that can be transmitted to an indexing computing system to instruct the indexing computing system to index the token data 1214, partially index 1216 the token data, or not index 1218 the token data. The index determination 1212 can be based on the identification data such that candidate token data with a first threshold likelihood may be indexed 1214, candidate token data with a likelihood between a first threshold and a second threshold may be partially indexed 1216, and candidate token data with a likelihood below both thresholds may not be indexed 1218.

Alternatively and/or additionally, the candidate token data sets determined to be associated with a non-fungible token may be indexed: however the level of indexing may be based on a quality metric, such that high quality token data sets may be fully indexed 1214, while low quality token data sets may be partially indexed 1216.

Figure 5:
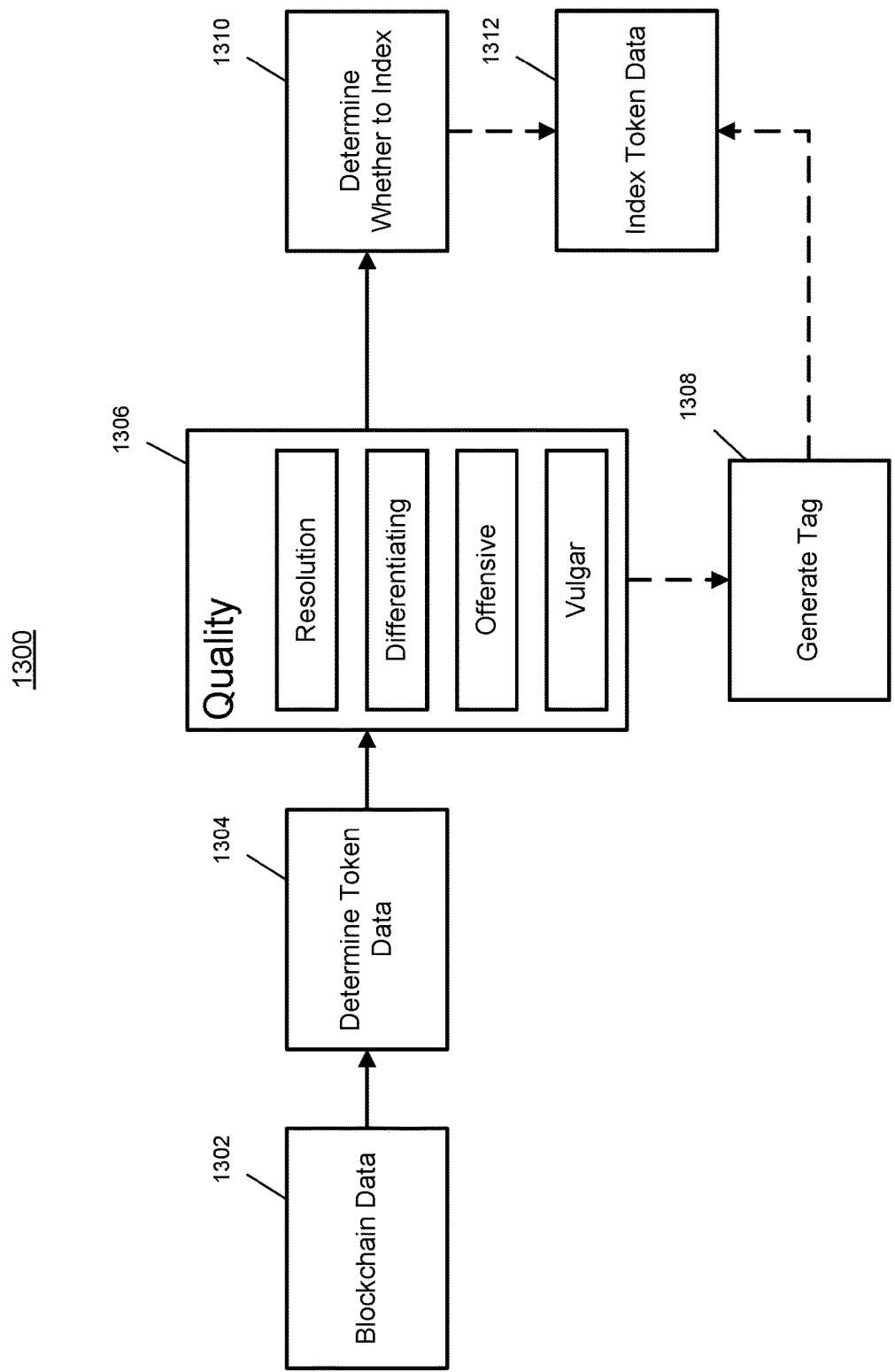
FIG. 5 depicts a block diagram of an example quality determination system according to example embodiments of the present disclosure.

FIG. 5 depicts a block diagram of an example quality determination system 1300 according to example embodiments of the present disclosure. In particular, the quality determination system 1300 can obtain blockchain data 1302, determine token data 1304 in the blockchain data 1302, generate quality data 1306 for the token data, and determine whether to index 1310 the token data based on the quality data 1306.

For example, blockchain data 1302 can be obtained from a blockchain repository (e.g., blockchain data pre-filtered in a sandbox after being obtained from a blockchain node). The blockchain data 1302 can be processed to determine token data 1304 in the blockchain data 1302 (e.g., the blockchain data can be processed to determine a subset of the blockchain data includes data associated with a non-fungible token).

The token data can then be processed to generate quality data 1306 associated with the token data. The quality data 1306 can be determined based on the resolution of the digital resource associated with the non-fungible token of the token data. Additionally and/or alternatively, the quality data 1306 may be generated based on a level of differentiation between the digital resource of the associated non-fungible token. The level of differentiation can be based on whether the digital resource amounts to more than just white noise, a blank image, and/or non-descript data. In some implementations, the level of differentiation can be based on whether the digital resource is the same or substantially similar to other digital resources associated with other non-fungible tokens. The minting date and/or the date of origin of the digital resource may be considered. Additionally and/or alternatively, the quality data 1306 may be based on whether the non-fungible token includes vulgar and/or offensive content (e.g., the digital resource depicts nudity and/or the title includes hate speech).

The quality data 1306 can be utilized to generate one or more tags 1308 for the processed token data. Additionally and/or alternatively, the quality data 1306 can be utilized to determine whether to index 1310 the token data.

The token data may be indexed 1312 based on the determination whether to index 1310. The indexing 1312 can include indexing the token data with the one or more generated tags 1308.

Figure 10:
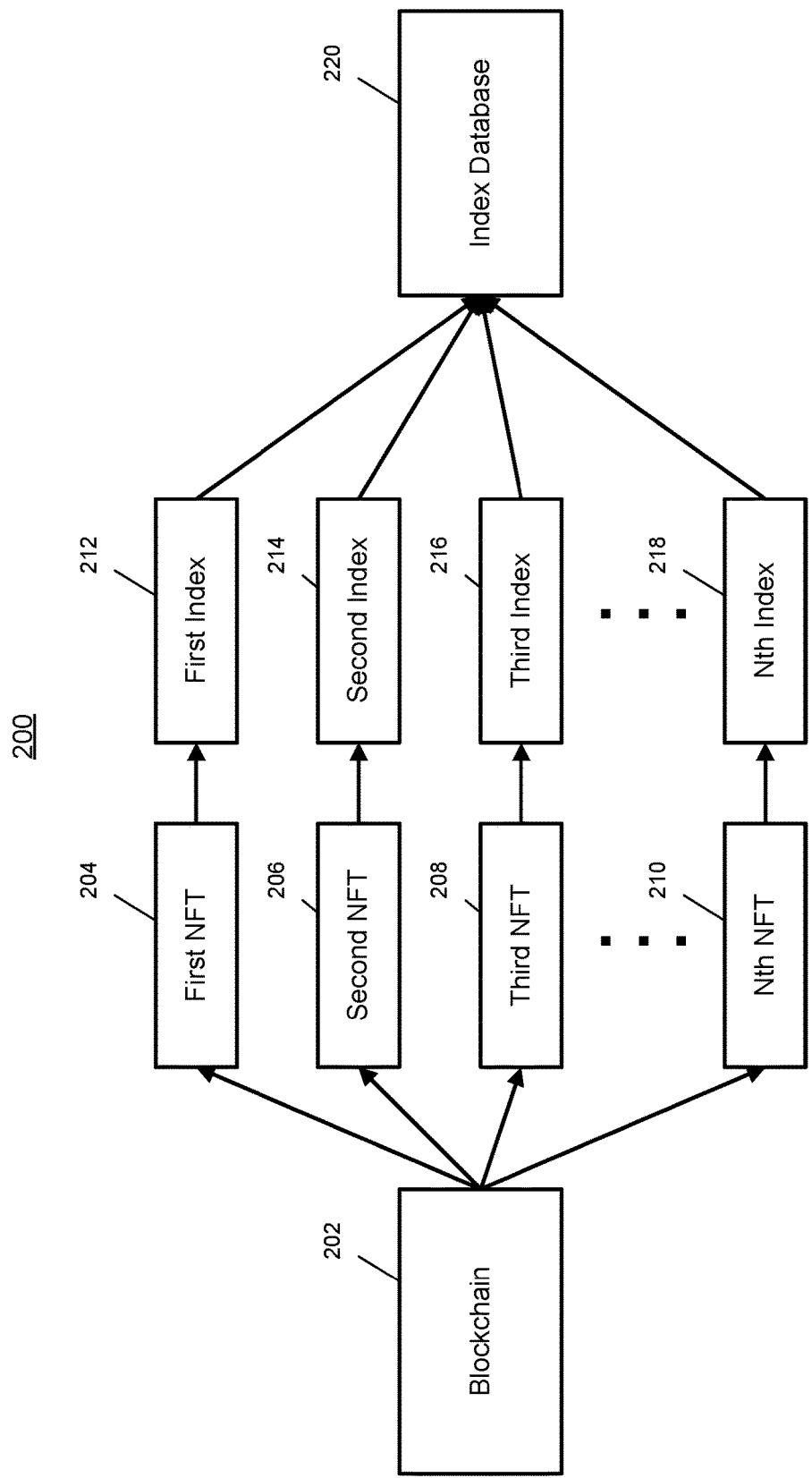
FIG. 10 depicts a block diagram of an example indexing system according to example embodiments of the present disclosure.

FIG. 10 depicts a block diagram of an example indexing system 200 according to example embodiments of the present disclosure. In some implementations, the indexing system 200 is configured to receive blockchain data 202 descriptive of a blockchain that stores data associated with a plurality of non-fungible tokens and, as a result of receipt of the input data 202, provide output data 220) that is descriptive of a plurality of index datasets associated with the plurality of non-fungible tokens. Thus, in some implementations, the indexing system 200 can include one or more models and/or one or more functions for identifying token data and extracting relevant information for generating index data.

In particular, the example indexing system 200 can include obtaining blockchain data 202 associated with a blockchain. The blockchain data 202 can include code for the blockchain. Additionally and/or alternatively, the blockchain data 202 can include script data (e.g., data descriptive of script that can be deployed to interact with smart contract code of the blockchain data 202) associated with a plurality of non-fungible tokens.

The blockchain data 202 can be processed to identify first token data for a first non-fungible token 204, second token data for a second non-fungible token 206, third token data for a third non-fungible token 208, and nth token data for a nth non-fungible token 210. Identifying the token data sets can involve parsing the blockchain data and determining if each parsed segment is associated with one or more non-fungible token characteristics. Alternatively and/or additionally, identifying the token data can include crawling the blockchain data to search for particular characteristics, structure, and/or features associated with token data.

The first token data associated with the first non-fungible token 204 can be processed to generate first index data 212 associated with the first non-fungible token 204. The second token data associated with the second non-fungible token 206 can be processed to generate second index data 214 associated with the second non-fungible token 206. The third token data associated with the third non-fungible token 208 can be processed to generate third index data 216 associated with the third non-fungible token 208. The nth token data associated with the nth non-fungible token 210 can be processed to generate nth index data 218 associated with the nth non-fungible token 210.

The first index data 212, the second index data 214, the third index data 216, and the nth index data 218 can be stored in an index database 220, which can then be utilized for various tasks (e.g., non-fungible token search). The index datasets can include index information associated with a plurality of index item fields. The index datasets can include a title of the non-fungible token, a reference to the digital resource payload, descriptors, and/or a variety of other index items for annotating and/or characterizing aspects of the non-fungible token which may be searched.

Figure 11:
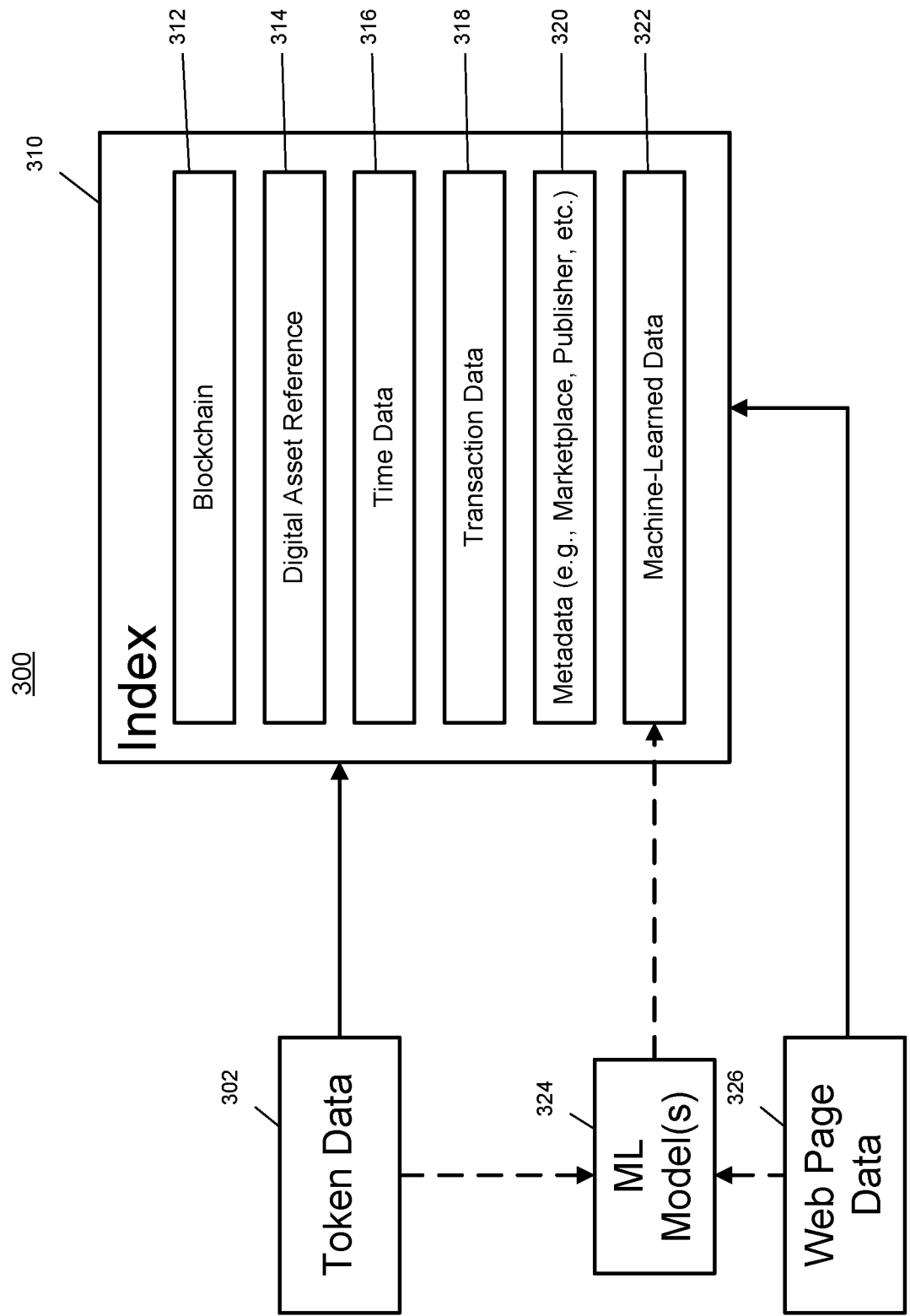
FIG. 11 depicts a block diagram of an example index dataset according to example embodiments of the present disclosure.

FIG. 11 depicts a block diagram of an example index dataset 300 according to example embodiments of the present disclosure. In some implementations, index data 310 can be generated based on blockchain data and/or web page data 326. The blockchain data can be processed to identify a subset of the blockchain data that is descriptive of token data 302. The token data 302 can be processed to determine one or more index items for the index data 310 generation. Additionally and/or alternatively, web page data 326 associated with the same or related non-fungible token to the non-fungible token associated with the token data 302 can be utilized to determine one or more additional index items for one or more index item fields.

Additionally and/or alternatively, the token data 302 and/or the web page data 326 can be processed with one or more machine-learned models 324 to generate one or more outputs that can be utilized as index items for the index data 310. Alternatively and/or additionally, the input data for the one or more machine-learned models 324 can be obtained from other data sources. In some implementations, the index data 310) can include data descriptive of the blockchain 312 the non-fungible token is minted on. The index data 310 can include a reference 314 to the digital resource (e.g., a URI), time data 316 (e.g., a minting time, a first digital resource publication times, and/or a time difference between the two times), transaction data 318 (e.g., purchase times, amount of acquisitions, frequency of acquisitions, identities of purchasers and bidders, and/or auction event data), metadata 320) (e.g., stored by the blockchain, marketplace, and/or another data source), other machine-learned data 322, and/or other derived data.

Figure 12:
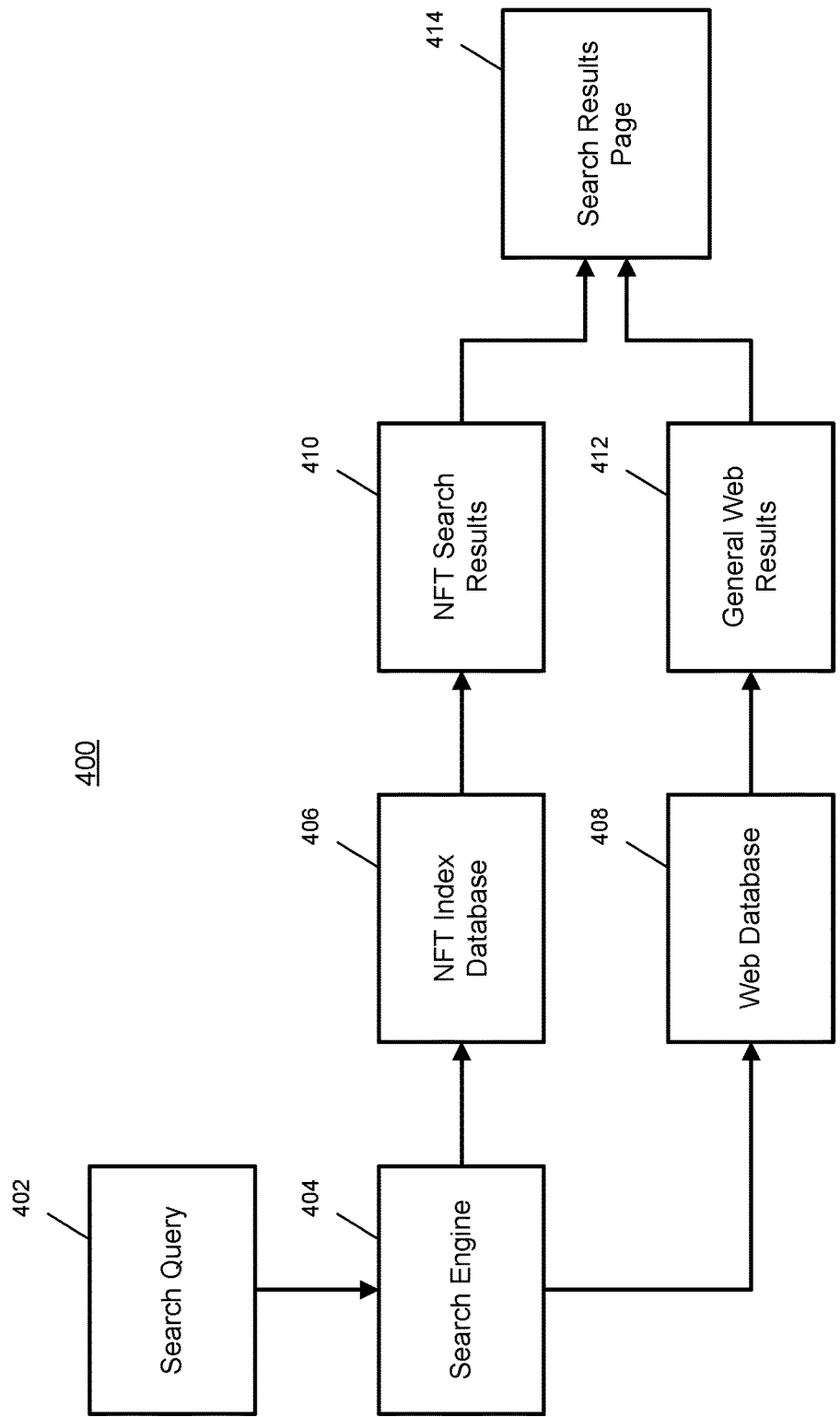
FIG. 12 depicts a block diagram of an example search according to example embodiments of the present disclosure.

FIG. 12 depicts a block diagram of an example search 400 according to example embodiments of the present disclosure. The example search 400 can include receiving a search query 402. The search query 402 can include one or more words, one or more images, and/or one or more other forms of input. The search query 402 can be processed by a search engine 404 which can then access a non-fungible token index database 406 to determine one or more non-fungible token search results 410 responsive to the search query 402. Additionally and/or alternatively, the search query 402 can be processed by the search engine 404 which can then access a web database 408 to determine one or more general web results 412 responsive to the search query 402. The one or more non-fungible token search results 410 and/or the one or more general web results 412 can be utilized to generate a search results page 414. The search results page 414 can then be provided for display.

Figure 13A:
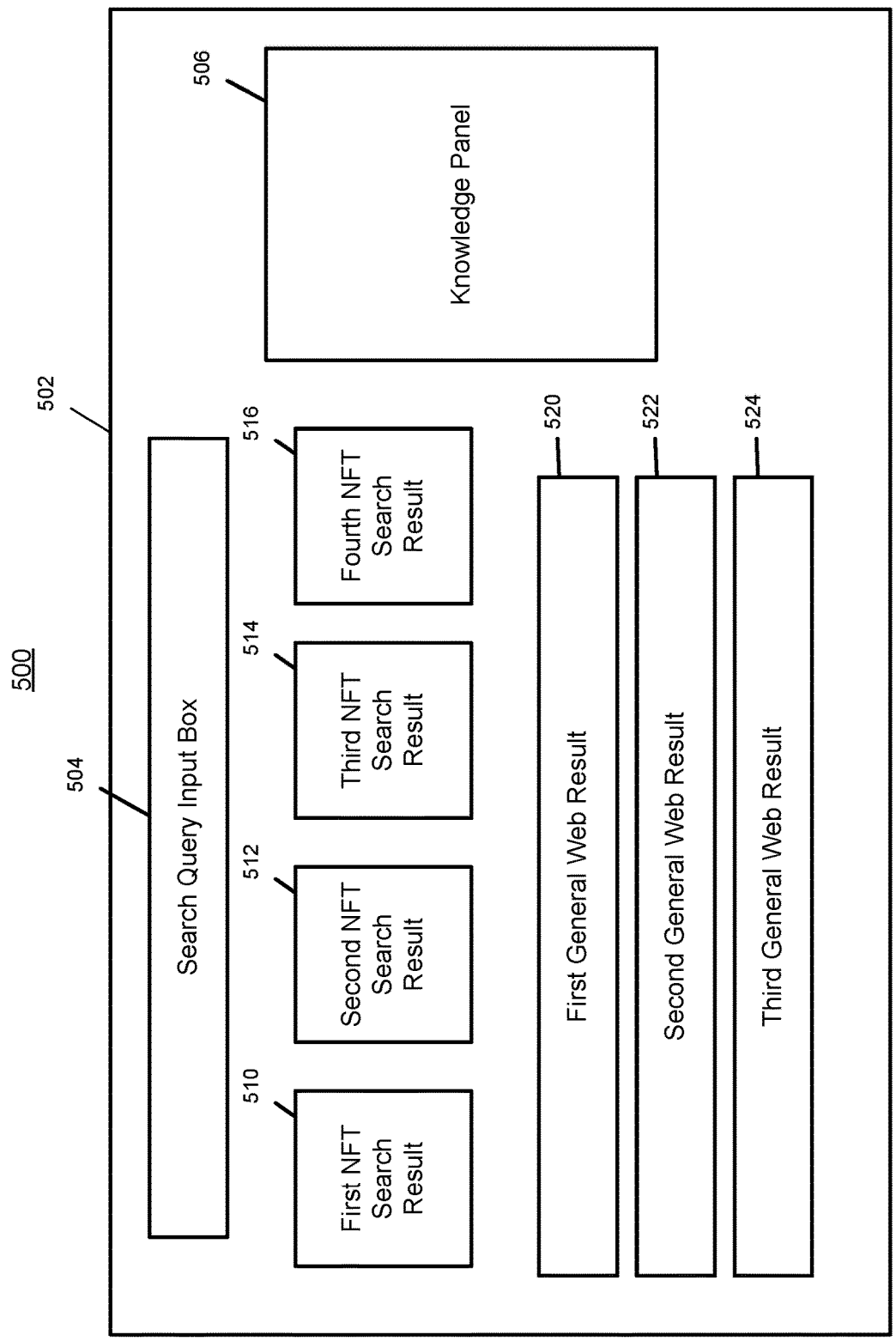
FIG. 13A depicts an illustration of an example search results page according to example embodiments of the present disclosure.
Figure 13B:
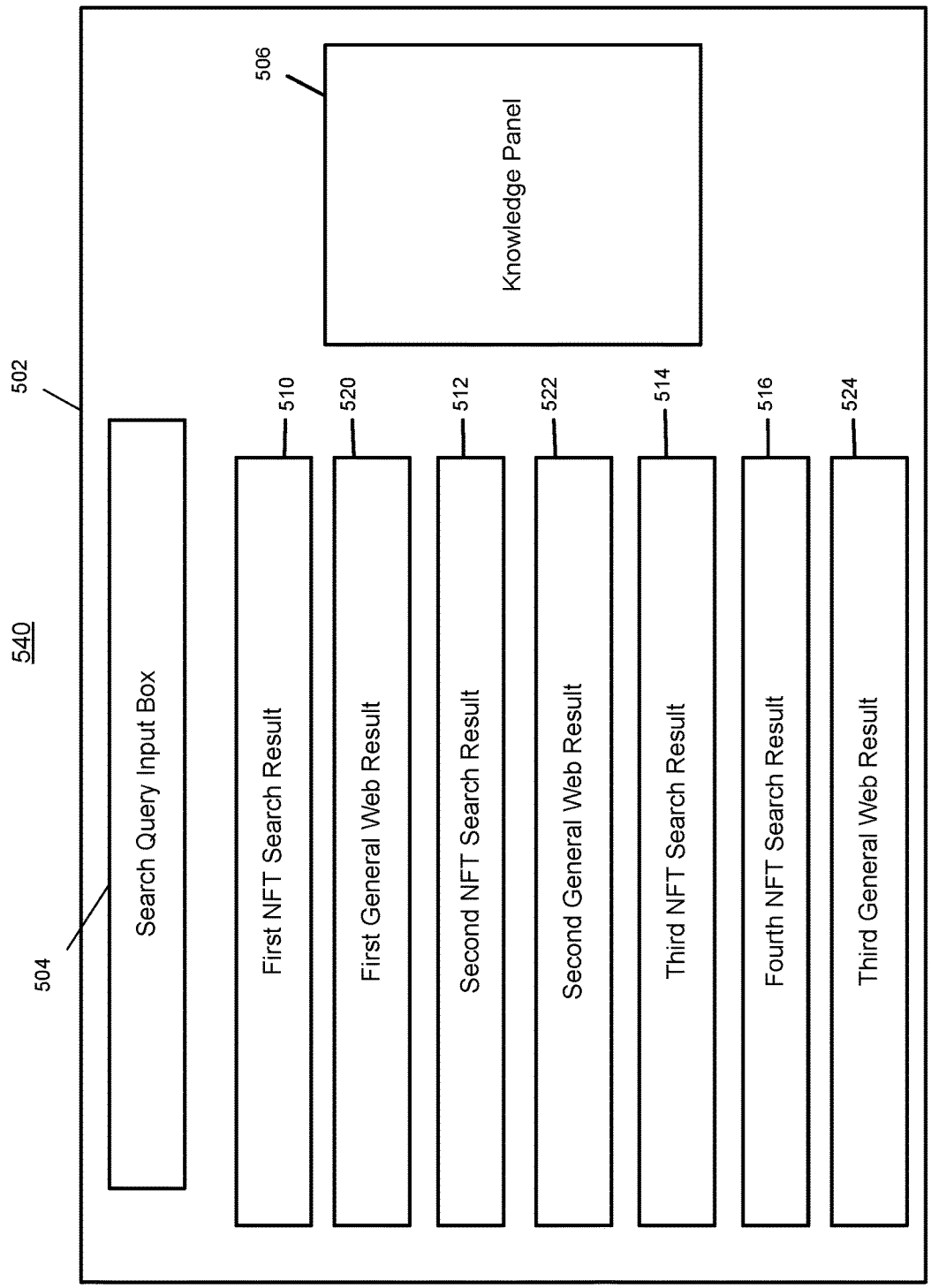
FIG. 13B depicts an illustration of an example search results page according to example embodiments of the present disclosure.
Figure 13C:
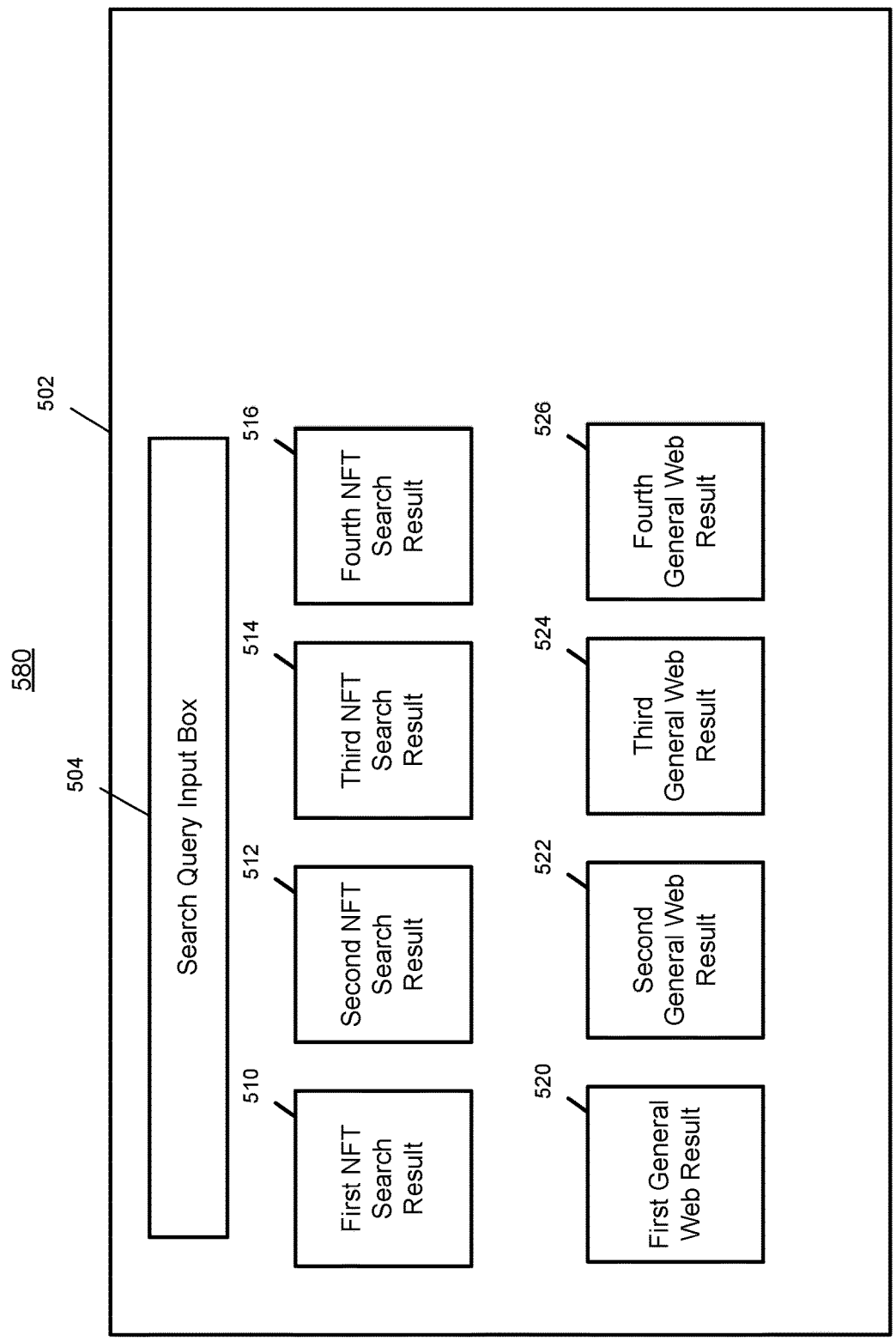
FIG. 13C depicts an illustration of an example search results page according to example embodiments of the present disclosure.

FIGS. 13A-13C depict different example search result page configurations. Although three configurations are depicted, other variations may be utilized to provide search results for display. The different variations depicted can include a search interface 502, which can include a search query input box 504, one or more non-fungible token search results (e.g., a first non-fungible token search result 510, a second non-fungible token search result 512, a third non-fungible token search result 514, and/or a fourth non-fungible token search result 516), one or more general web results (e.g., a first general web result 520, a second general web result 522, a third general web result 524, and/or a fourth general web result 526), and/or a knowledge panel 506. The search query input box 504 can be configured to receive and/or display one or more search queries. The one or more non-fungible token search results and the one or more general web results can be determined and provided based on a determined responsiveness to an input search query. Additionally and/or alternatively, the knowledge panel 506 can include structured data associated with a topic determined to be responsive to an input query.

FIG. 13A depicts an illustration of an example search results page 500 according to example embodiments of the present disclosure. The example search results page 500 includes the search query input box 504 displayed at the top of the search interface 502 with a knowledge panel 506 displayed in a side panel of the search interface 502. Additionally, the example search results page 500 includes a non-fungible token search results portion, which displays the one or more non-fungible token search results (e.g., a first non-fungible token search result 510, a second non-fungible token search result 512, a third non-fungible token search result 514, and/or a fourth non-fungible token search result 516). The example search results page 500 can include a separate general web results portion, which can display the one or more general web results (e.g., a first general web result 520, a second general web result 522, a third general web result 524, and/or a fourth general web result 526). Additionally and/or alternatively, the one or more non-fungible token search results and the one or more general web results can be provided in different formats (e.g., the non-fungible token search results can be provided with image thumbnails while the general web results can be displayed with only text).

FIG. 13B depicts an illustration of an example search results page 540) according to example embodiments of the present disclosure. The example search results page 540) includes the search query input box 504 displayed at the top of the search interface 502 with a knowledge panel 506 displayed in a side panel of the search interface 502. The example search results page 540) can include the one or more non-fungible token search results (e.g., a first non-fungible token search result 510, a second non-fungible token search result 512, a third non-fungible token search result 514, and/or a fourth non-fungible token search result 516) and the one or more general web results (e.g., a first general web result 520, a second general web result 522, a third general web result 524, and/or a fourth general web result 526) can be displayed in an intermingled format, such that the different types of search results may be adjacent to one another. The order may be determined based on a determined score based on a responsiveness to a search query and/or based on other factors. The ordering may be based purely on score without preference to the type of result.

FIG. 13C depicts an illustration of an example search results page 580) according to example embodiments of the present disclosure. The example search results page 580) can include both the one or more non-fungible token search results (e.g., a first non-fungible token search result 510, a second non-fungible token search result 512, a third non-fungible token search result 514, and/or a fourth non-fungible token search result 516) and the one or more general web results (e.g., a first general web result 520, a second general web result 522, a third general web result 524, and/or a fourth general web result 526) can be provided for display with media content item previews.

Example Methods

Figure 6:
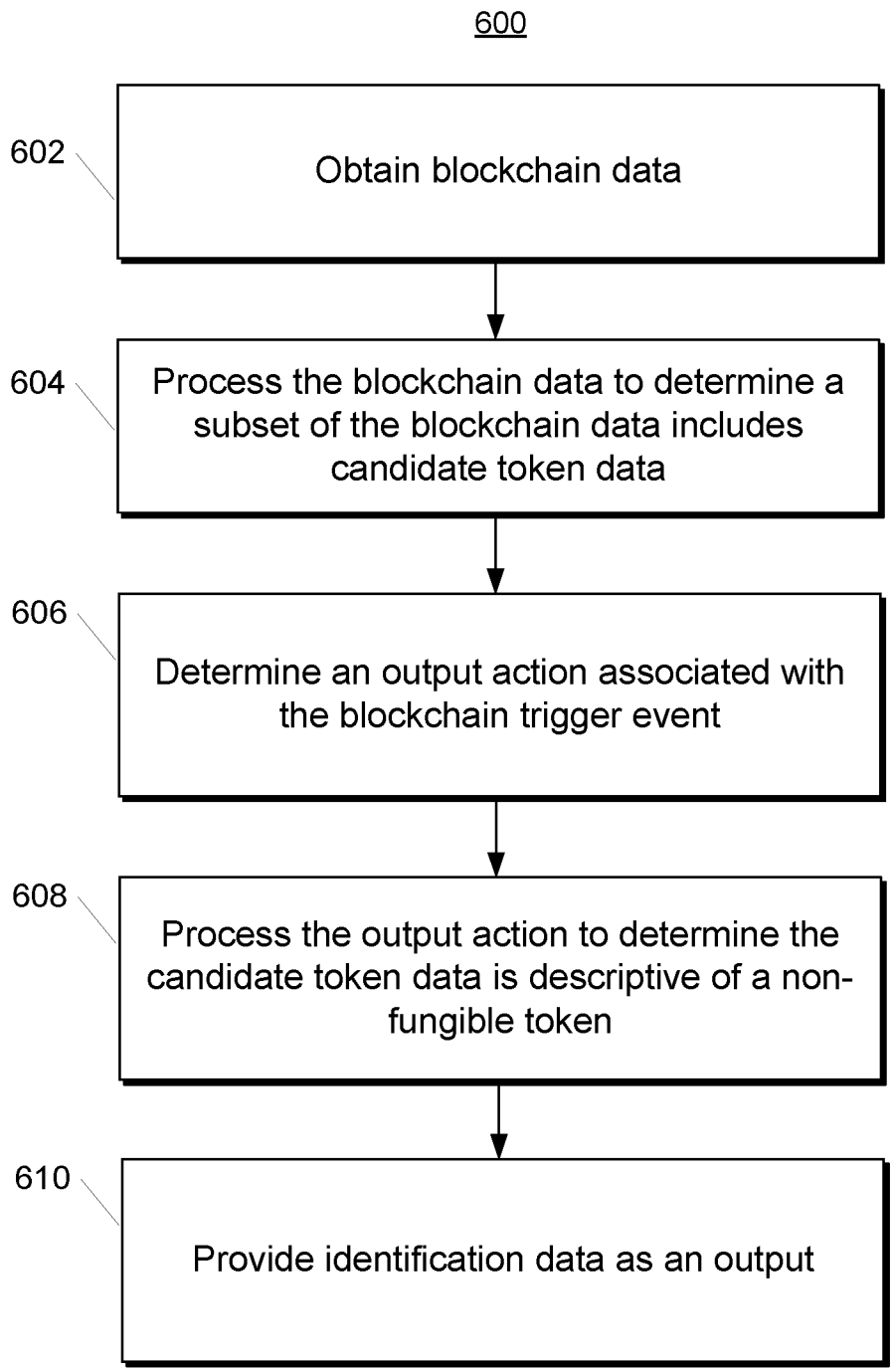
FIG. 6 depicts a flow chart diagram of an example method to perform token data identification according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain blockchain data. The blockchain data can be associated with a blockchain. For example, the blockchain data can include byte code associated with a blockchain. The blockchain data can be associated with a plurality of non-fungible tokens. The plurality of non-fungible tokens can be associated with a plurality of digital assets. In some implementations, the blockchain data can be obtained from a blockchain node associated with a particular blockchain. The blockchain data can include prefiltered blockchain data that has been processed to filter out data that may not be utilized during indexing.

At 604, the computing system can process the blockchain data to determine a subset of the blockchain data includes candidate token data. The candidate token data can be associated with a blockchain trigger event (e.g., an if-then event that can cause a transfer of a digital resource (e.g., a digital asset)). In some implementations, the candidate token data can be determined based on one or more standards associated with non-fungible token code standards. Additionally and/or alternatively, the candidate token data can include reference data associated with the digital resource. The blockchain trigger event can be associated with a smart contract.

At 606, the computing system can determine an output action associated with the blockchain trigger event. The output action can be associated with a digital resource. In some implementations, the output action can be a resulting action in response to the blockchain trigger event occurring. The output action can be associated with an embedded uniform resource identifier, an embedded uniform resource locator, and/or a peer-to-peer network address (e.g., an IPFS address).

In some implementations, processing the output action to determine the candidate token data is descriptive of the non-fungible token can include determining an entity associated with the output action and determining the entity is a digital resource (e.g., a digital asset) being transferred in response to the blockchain trigger event. Alternatively and/or additionally, the entity can be processed to determine the smart contract is an empty contract. In response to the smart contract being an empty contract, the identification data may be descriptive of the candidate token data not being data to index.

Alternatively and/or additionally, processing the output action to determine the candidate token data is descriptive of the non-fungible token can include determining the output action includes a link to a landing address. Landing data associated with the landing address can be obtained. The landing data can then be processed to determine the landing data comprises a digital resource (e.g., a digital asset). The digital resource can be determined to be associated with the non-fungible token.

Alternatively and/or additionally, processing the output action to determine the candidate token data is descriptive of the non-fungible token can include obtaining, via an application programming interface, a uniform resource identifier.

At 608, the computing system can process the output action to determine the candidate token data is descriptive of a non-fungible token. The determination can be determined based on the output action being associated with a digital resource (e.g., a digital asset). In some implementations, the determination can be determined based on the output action being descriptive of an intent for the smart contract to be associated with a non-fungible token.

At 610, the computing system can Provide identification data as an output. The identification data can be descriptive of the candidate token data being associated with the non-fungible token. The identification data can be generated based on the determination that the candidate token data is descriptive of the non-fungible token. The identification data can be descriptive of the candidate token data including token data for indexing.

In some implementations, the computing system can include determining a validity of the candidate token data. The validity can be determined based on whether the candidate token data includes determined problematic characteristics. The identification data may be generated based at least in part on the validity.

In some implementations, the computing system can process the output action to determine a digital resource (e.g., a digital asset) associated with the non-fungible token. The digital resource can be processed to determine a quality of the digital resource (e.g., the quality of the digital asset). The computing system can determine whether to index the candidate token data based at least in part on the identification data and the quality of the digital resource. The quality of the digital resource can be determined based on at least one of a resolution of the digital resource, a size of the digital resource, or a determined uniqueness of the digital resource.

Figure 7:
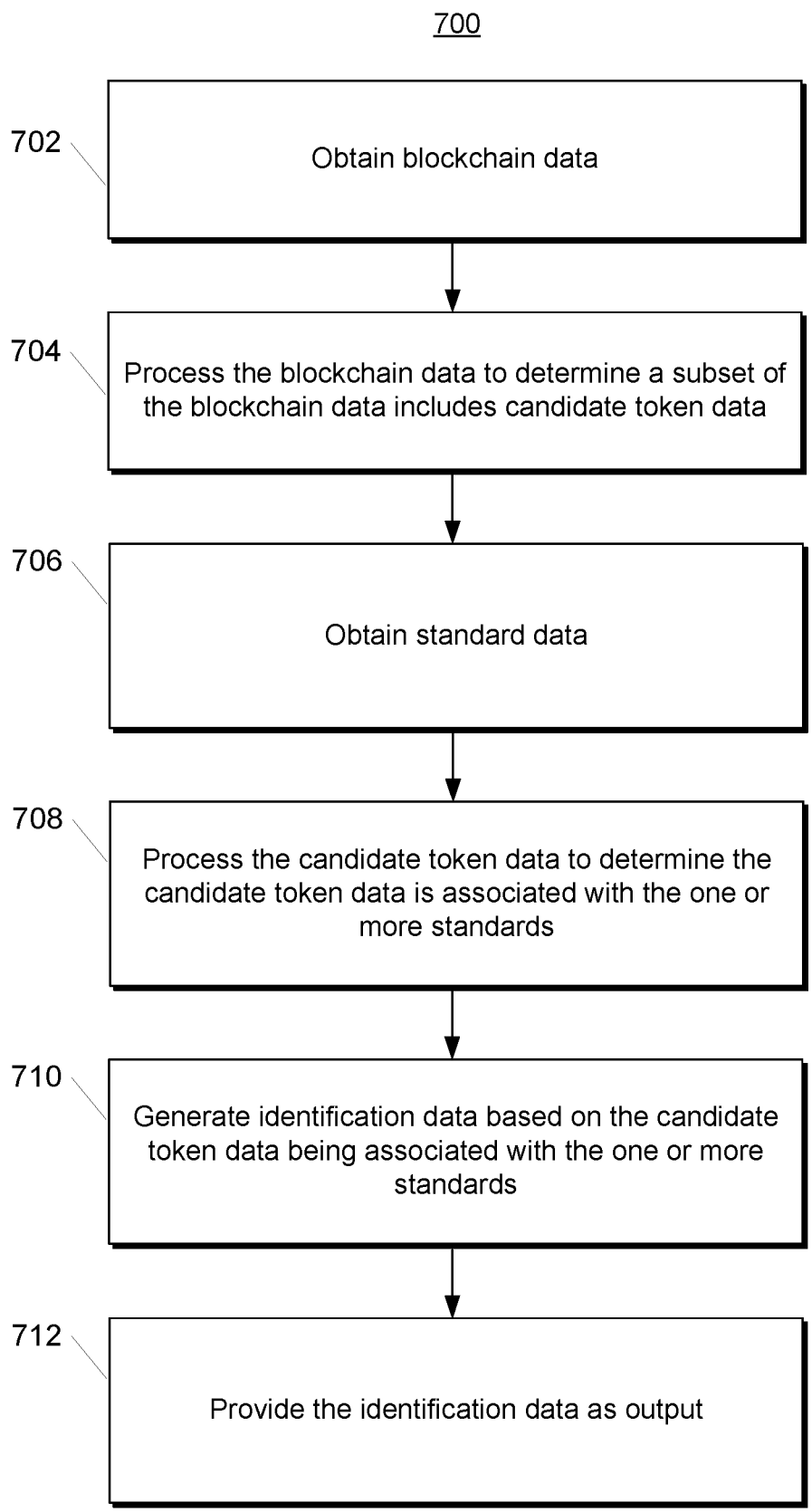
FIG. 7 depicts a flow chart diagram of an example method to perform token data identification according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain blockchain data. The blockchain data can include byte code associated with a blockchain. The blockchain data can be associated with a plurality of smart contracts. The plurality of smart contracts can include a plurality of logic sets (e.g., a plurality of if-then logic sets).

In some implementations, obtaining the blockchain data can include obtaining first node data from a blockchain node. The blockchain node can be associated with a particular blockchain. Obtaining the blockchain data can further include processing the first node data in a sandbox to generate a first portion of the blockchain data and storing the first portion of the blockchain data.

Additionally and/or alternatively, obtaining the blockchain data can include obtaining second node data from the blockchain node. The blockchain node can be associated with the particular blockchain. In some implementations, obtaining the blockchain data can further include processing the second node data in the sandbox to generate a second portion of the blockchain data and storing the second portion of the blockchain data.

At 704, the computing system can process the blockchain data to determine a subset of the blockchain data includes candidate token data. In some implementations, the candidate token data can be associated with a blockchain trigger event. The blockchain trigger event can include an if-then event such that if a certain event occurs, a digital resource can have a transfer in ownership.

At 706, the computing system can obtain standard data. The standard data can include one or more standards associated with standards for a non-fungible token. The standards can be associated with predetermined interfaces for uniform interfacing with different non-fungible tokens. The smart contract structure can conform to the standards to enable a standard application programming interface to facilitate interactions with different non-fungible tokens (e.g., regardless of the particular publisher).

At 708, the computing system can process the candidate token data to determine the candidate token data is associated with the one or more standards. The determination can include searching the candidate token data to determine whether one of the predetermined interfaces is included in the candidate token data. In some implementations, the candidate token data can be processed to identify whether a particular blockchain trigger event language is included in the candidate token data.

At 710, the computing system can generate identification data based on the candidate token data being associated with the one or more standards. The identification data can be descriptive of the candidate token data being associated with the non-fungible token.

At 712, the computing system can provide the identification data as output. The identification data can be provided to a user computing system. In some implementations, the identification data can be provided to an indexing computing system to instruct the index computing system whether to index the candidate token data.

In some implementations, the blockchain trigger event can be processed to determine a digital asset associated with the non-fungible token. The digital asset can be processed to determine the digital asset is vulgar, and the systems and methods can determine whether to index the candidate token data based at least in part on the identification data and the digital asset being vulgar.

Index data can then be generated based on the candidate token data and the identification data. The identification data can be utilized to determine whether to and at what extent to index the candidate token data. In some implementations, data descriptive of the identification data can be indexed with other data associated with the candidate token data.

Figure 8:
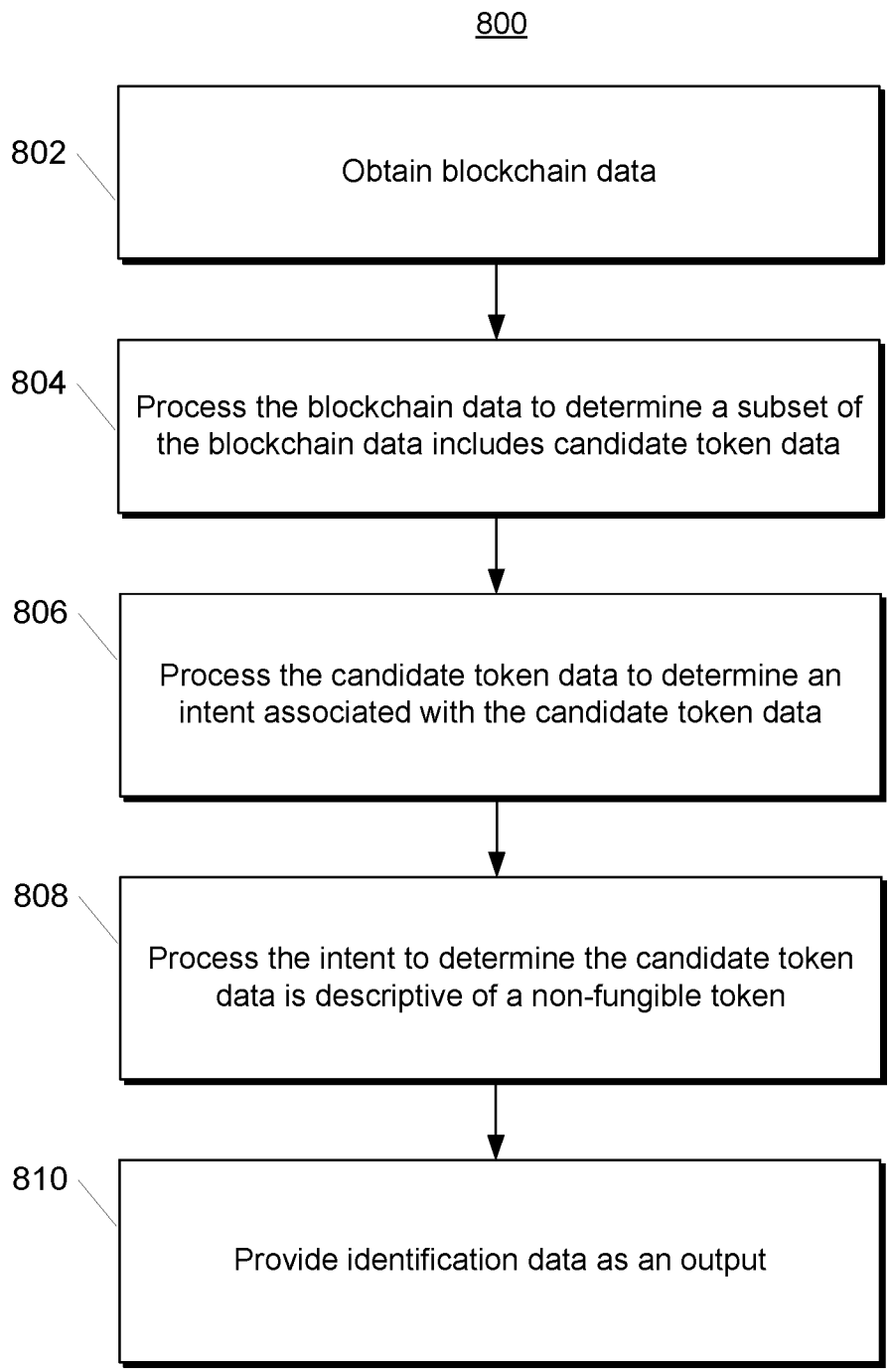
FIG. 8 depicts a flow chart diagram of an example method to perform token data identification according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain blockchain data. The blockchain data can include byte code associated with a blockchain. The blockchain data may be obtained from a blockchain node. Alternatively and/or additionally, the blockchain data may be obtained from a non-blockchain repository.

At 804, the computing system can process the blockchain data to determine a subset of the blockchain data includes candidate token data. The candidate token data can be associated with a blockchain trigger event. In some implementations, the candidate token data can include data descriptive of a smart contract. The blockchain trigger event can be an event that triggers the transfer of a payload of a smart contract.

At 806, the computing system can process the candidate token data to determine an intent associated with the candidate token data. The candidate token data can include reference data associated with a digital resource. In some implementations, the intent can be determined based on the blockchain trigger event. Alternatively and/or additionally, the intent can be determined based at least in part on freeform text in the candidate blockchain data. The intent can be a minting intent to publish the non-fungible token on the blockchain.

At 808, the computing system can process the intent to determine the candidate token data is descriptive of a non-fungible token. For example, the intent can be processed to determine whether the intent meets a threshold likelihood of being a non-fungible token intent.

At 810, the computing system can provide identification data as an output. The identification data can be descriptive of the candidate token data being associated with the non-fungible token.

Example Indexing and Uses

The systems and methods disclosed herein can identify data associated with non-fungible tokens in a blockchain (e.g., in the code of a blockchain). For example, a plurality of non-fungible tokens can be identified and indexed based on a plurality of techniques. One technique can include analyzing (e.g., crawling) a blockchain to identify data associated with a non-fungible token. The data can then be parsed to determine identifiable data that can be indexed. Another technique can include analyzing (e.g., crawling) a non-fungible token marketplace to identify non-fungible tokens for sale. Data related to the non-fungible tokens can then be obtained and indexed. In some implementations, multiple techniques can be utilized for generating a more encompassing database for search.

The systems and methods disclosed herein can include obtaining blockchain data from a blockchain computing system. The blockchain data can include one or more function signatures. In some implementations, the blockchain data can include script data associated with a digital asset. A particular portion (e.g., a subset) of the blockchain data can be determined to include token data. The token data can be descriptive of a non-fungible token associated with a digital asset. Index data can be generated based on the token data. The index data can include information obtained from the blockchain data. In some implementations, the index data can be associated with the digital asset. The index data can then be stored in an index database. The index database can then be utilized for a variety of purposes (e.g., non-fungible token search, data aggregation and analysis, training data for a machine-learned model, and/or for generating statistical representations).

The systems and methods can obtain blockchain data (e.g., code from a blockchain) from a blockchain computing system (e.g., a decentralized computing system storing distributed data). The blockchain data can include one or more function signatures. In some implementations, the blockchain data can include script associated with a digital asset. The blockchain data may be obtained via a blockchain node. Blockchain data can include the code and/or records stored on the blockchain. The code can include the script and can be descriptive of a plurality of smart contracts. The blockchain data can include transactional data associated with the acquisition of digital assets and/or the exchange of digital currency (e.g., crypto currency). In some implementations, the transactional data may be descriptive of one or more mutations to the contract (e.g., "setURI", etc.). The blockchain data can include metadata associated with one or more non-fungible tokens.

The systems and methods disclosed herein can include determining a particular portion of the blockchain data includes token data. The token data can be descriptive of a non-fungible token associated with a digital asset. Alternatively and/or additionally, the systems and methods can determine a subset of the blockchain data includes token data based on the subset having a structure associated with one or more standards. The token data can be descriptive of a non-fungible token associated with the digital asset. In some implementations, the structure can include a format for code in the blockchain data associated with a standard format for non-fungible token code.

In some implementations, the blockchain data can be parsed, and each parsed segment of the blockchain data can be processed to classify whether the parsed segment includes token data descriptive of a non-fungible token. The classification can be generated with a machine-learned classification model that has been trained to classify whether the parsed segment includes data associated with a non-fungible token (e.g., whether the data includes reference to a payload, meets one or more standards, and/or is descriptive of a smart contract). In some implementations, the blockchain data can be parsed with a machine-learned segmentation model trained to parse blockchain data based on one or more factors (e.g., syntax, semantics, structure, code length, payload characteristics, code features, latent encode markers, and/or another machine-learned characteristics).

In some implementations, determining the particular portion of the blockchain data includes the token data can include determining a particular portion of the blockchain data includes token data based on the one or more function signatures. The one or more function signatures can be associated with a non-fungible token standard.

Alternatively and/or additionally, determining the particular portion of the blockchain data includes the token data can include determining the particular portion includes a smart contract associated with a digital media item. The digital media item can be a payload for the smart contract. In some implementations, the digital media item can be the digital asset.

Index data can then be generated based on the token data. The index data can include information obtained from the blockchain data. In some implementations, the index data can be associated with the digital asset. The index data can include transaction data associated with the non-fungible token. The index data can include data descriptive of metadata associated with the non-fungible token. In some implementations, the index data can include a digital asset type associated with the digital asset. The digital asset type can be an augmented-reality rendering asset type, and the digital asset can be an augmented-reality rendering asset. The index data can include whether the URI (Uniform Resource Identifier) has changed and whether data (e.g., the pixels of an image and/or text of a text string) of the payload have changed (e.g., when the URI has changed: however, the change of the data may occur and be indexed without a change to the URI). Additionally and/or alternatively, the index data can include information descriptive of a change to the URI. The index data can include data that may be descriptive of factors that can be utilized to determine whether the non-fungible token involves fraud.

In some implementations, generating index data based on the token data can include obtaining the digital asset associated with the non-fungible token, processing the digital asset to determine one or more features in the digital asset, and generating feature data descriptive of the one or more features. The index data can include the feature data.

In some implementations, generating the index data can include determining the digital asset associated with the non-fungible token and processing the non-fungible token with a machine-learned model (e.g., a classification model, a detection model, a feature extractor model, and/or a semantics model) to determine one or more classifications, features, and/or attributes associated with the digital asset. The one or more classifications, features, and/or attributes can be included in the index data. The index data can include a name associated with the non-fungible token and/or the digital asset, a name of the digital asset creator/publisher, transaction data (e.g., the current and/or past owners, purchase price, transactional trends, trends of related non-fungible tokens, gas price, etc.), a topic of the digital asset, non-fungible token metadata, pixel labels, non-fungible token description, freeform text associated with the non-fungible token, and/or notoriety associated with the non-fungible token, the publisher, or the creator.

The digital asset can include image data, video data, text data, audio data, a domain, an augmented-reality asset, a virtual-reality experience, and/or latent encoding data. In some implementations, the digital asset can include image data, and processing the digital asset can include processing the digital asset with a machine-learned model to determine one or more image features.

Alternatively and/or additionally, generating the feature data descriptive of the one or more features can include determining one or more feature descriptor terms associated with the one or more features. The feature data can be descriptive of the one or more feature descriptor terms.

In some implementations, the systems and methods can include determining a web content item is associated with the digital asset. A publication time associated with the web content item can be obtained. The systems and methods can determine a mint time associated with the non-fungible token based on the blockchain data. Time difference data can be generated based on the mint time and the publication time. In some implementations, the index data can include the time difference data.

Alternatively and/or additionally, generating the index data based on the token data can include determining reference data associated with the digital asset based on the token data and determining a publisher of the non-fungible token based one the token data. The index data can include data descriptive of the reference data, the publisher, and a particular blockchain associated with the blockchain data.

The systems and methods can store the index data in an index database. The index database can be stored on a server computing system. The index database can include a plurality of index datasets associated with a plurality of non-fungible tokens. For example, first token data can be identified to generate a first index dataset, second token data can be identified to generate a second index dataset, and third token data can be identified to generate a third index dataset. The first token data can be associated with a first non-fungible token, the second token data can be associated with a second non-fungible token, and the third token data can be associated with a third non-fungible token.

The index database can be utilized for a plurality of different uses. For example, the index database can be utilized as a database for storing non-fungible token data for quick retrieval upon request or search. The systems and methods can include receiving a request for the digital asset from a user computing system and providing the token data to the user computing system.

The index database can include index datasets generated based on blockchain data, web page data, and/or data obtained from other sources.

Alternatively and/or additionally, the systems and methods disclosed herein can obtain web page data from a web page. The web page data can be descriptive of listing information for a non-fungible token. In some implementations, the web page data can include data associated with a digital asset. Additionally and/or alternatively, obtaining the web page data can include generating a snapshot of a web page listing the non-fungible token for sale. In some implementations, the web page data can be descriptive of a leaf page of a digital web platform website (e.g., a digital marketplace website) that hosts and/or facilitates the purchase and sales of the non-fungible tokens. The web page data can include a snapshot of a webpage, which can include image data, text data, and/or latent encoding data.

A particular portion (e.g., a subset) of the web page data can be processed to determine the web page data includes token data. The token data can be descriptive of the non-fungible token associated with the digital asset. Alternatively and/or additionally, a digital marketplace website can be crawled to determine a plurality of leaf pages associated with a plurality of non-fungible tokens, and each leaf page can be processed to generate index data for each of the non-fungible tokens.

Index data can then be generated based on the token data. In some implementations, the index data can include information obtained from the web page data. The index data can be associated with the digital asset. Generating the index data can include processing the image data, the text data, and/or the latent encoding data of the leaf page to determine data associated with a plurality of index fields to be included in the index data.

The systems and methods can include storing the index data in an index database. The index database may be stored on a server computing system. In some implementations, the index database can be used to surface non-fungible token search results for a search engine. Additionally and/or alternatively, the index database can be utilized to determine statistics associated with non-fungible tokens. For example trending non-fungible tokens of a certain type and/or creator can be determined and then utilized for non-fungible token ranking in marketplaces, search result pages, and/or for informing users for informed purchasing.

The index database can include index data from a plurality of different sources (e.g., a plurality of different blockchains associated with a plurality of different blockchain computing systems and/or a plurality of different web pages associated with a plurality of different marketplaces). The index database can be utilized for a plurality of different tasks (e.g., search, statistical generation, and/or model training). For example, the systems and methods can obtain blockchain data. The systems and methods can include determining a subset of the blockchain data is descriptive of a non-fungible token associated with a digital asset. Index data can be generated based at least in part on the subset of blockchain data. The index data can include reference data associated with the digital asset. In some implementations, the index data can be stored in a search database. The systems and methods can include receiving a search query from a user computing system. The systems and methods can determine the search query is associated with index data. A search result associated with the digital asset can then be provided to the user computing system.

The systems and methods can include obtaining blockchain data (e.g., blockchain data obtained from a blockchain node associated with a blockchain computing system). Alternatively and/or additionally, the systems and methods can obtain web page data (e.g., marketplace data obtained via taking a snapshot of a web page associated with a non-fungible token marketplace). In some implementations, the systems and methods can include obtaining both blockchain data and web page data. The obtained data can be obtained via an application programming interface. In some implementations, the obtained data may be intervalley updated. The updates can occur at set intervals and/or may be obtained at a frequency based on transaction trends, type of digital asset, the particular blockchain, and/or based on cost.

The systems and methods can then determine a subset of the obtained data (e.g., the blockchain data and/or the web page data) is descriptive of a non-fungible token associated with a digital asset. The determination can be based on a search for a particular structure, particular terms, and/or particular actors. The determination can be based on known digital asset creators/publishers, known digital asset attributes, known digital asset types, known digital asset names, known digital asset descriptions, metadata, and/or labels. The determination may be based on the subset of obtained data being EIP (*EIP-721: Non-Fungible Token Standard*, ETHEREUM IMPROVEMENT PROPOSALS (Jan. 24, 2018), https://eips.ethereum.org/EIPS/eip-721) compliant. In some implementations, strict compliance may not need to be followed. For example, data types may deviate from the spec of the standards. The functional nature and/or the spirit of the data may be determined to be associated with a non-functional token.

Index data can be generated based at least in part on the subset of obtained data (e.g., the blockchain data and/or the web page data). In some implementations, the index data can include reference data (e.g., script data referencing a URL (Uniform Resource Locator) or URI) associated with the digital asset. The index data can include digital asset creators/publishers, digital asset attributes, digital asset type, digital asset name, digital asset description, metadata, payload information, smart contract information, free form text, transactional data, blockchain information (e.g., information associated with the particular blockchain the non-fungible token is minted on), mint time, first publication time of digital asset, digital asset changes, the particular web page (e.g., the particular marketplace), and/or labels (e.g., pixel labels). In some implementations, the obtained data can be processed to determine a non-fungible token community associated with the particular non-fungible token, and the non-fungible token community can be indexed in the index data.

In some implementations, the index data can be generated by processing the obtained data with one or more machine-learned models (e.g., a segmentation model, a detection model, a classification model, and/or a feature extractor model). Transaction history can be processed to determine price history for the non-fungible token, and the price history can be processed to index trend data and/or stability data. Additionally and/or alternatively, whether the non-fungible token was lazy minted or not may be indexed. The index data can include whether the non-fungible token was auctioned.

The systems and methods can then store the index data in a search database. The search database can include a plurality of index datasets associated with a plurality of non-fungible tokens. In some implementations, the plurality of non-fungible tokens can be identified by processing data from a plurality of sources.

In some implementations, the systems and methods can receive a search query from a user computing system. The search query can include one or more search terms. Alternatively and/or additionally the search query can include one or more images, audio data, latent encoding data, and/or multimodal data.

The search query can be processed to determine the search query is associated with the index data. The search query may be received and processed with a search engine. The search engine can be configured to crawl one or more blockchains, web pages, and/or the index database, or search database.

In some implementations, determining the search query is associated with index data can include determining one or more search terms of the search query are descriptive of at least one of the digital asset, an author of the digital asset, or non-fungible token metadata.

A search result associated with the digital asset can then be provided to the user computing system. The search result can include a preview of the digital asset. Alternatively and/or additionally, the search result can include an indicator indicating the search result is associated with a non-fungible token.

In some implementations, providing the search result associated with the digital asset to the user computing system can include determining one or more web pages are associated with the search query, generating one or more general web results based on the one or more web pages, and providing a search results page to the user computing system. The search results page can include the search result and one or more general web results.

In some implementations, the index data generated based on blockchain data and the index data generated based on web page data can be reconciled. For example, in an instance in which the blockchain data and web data are in conflict, the systems and methods can process the data, determine which data is more trustworthy, determine whether to merge the data, and/or determine whether to delete one or both sets of data.

In some implementations, the index data may be inter-valley updated. The updates can occur at set intervals and/or may be obtained at a frequency based on transaction trends, performance data, type of digital asset, the particular blockchain, time of minting (e.g., older non-fungible tokens may be updated less often due to larger computational cost associated with the crawl), and/or based on cost.

The index database can include an index item field associated with the digital asset type such that non-fungible tokens associated with augmented-reality rendering assets can be differentiated from non-fungible tokens associated with images. In some implementations, the index data can include how to launch, run, and/or view the payload (e.g., the digital asset). For example, a video player label, an image preview label, a particular augmented-reality application, and/or a particular device may be indexed.

Data extraction for index data generation can be machine-learned, based on heuristics, and/or may be deterministic.

The systems and methods disclosed herein can be utilized for search to allow a user to make a deliberate decision to invest or not invest in a particular non-fungible token.

In particular, the systems and methods can be utilized to make Web3 technology easily accessible to a significant chunk of our users (and not just early adopters or crypto enthusiasts who are well versed in Web3). The way Web3 may work can be a significant departure from a general users mental model. For example, the systems and methods may focus on simplifying the tech, jargon, applications, and/or setup.

The blockchain computing system can include a decentralized system: however, the systems and methods disclosed herein can be implemented in a decentralized system, a closed-off ecosystem, and/or a hybrid system including portions completed by a decentralized system and portions completed by a centralized system.

In some implementations, the systems and methods disclosed herein can be utilized for identity purposes. For example, the systems and methods disclosed herein can involve and/or interface with a crypto wallet of a user to store user identity data to be utilized across Web3. A user may sign into websites, share personal data, prove identity, and/or transfer crypto currency based in part on the identity data.

Wallet apps can be built-in to browser. In Web3, there may be a single mechanism to sign in while keeping your data for yourself.

The blockchain computing system can store data descriptive of a variety of information, which can include non-fungible token Content IDs and/or ownership information for the non-fungible tokens. Non-fungible tokens can introduce scarcity and authenticity to digital items.

The systems and methods disclosed herein can be implemented into a search engine to enhance image, video, and audio search. For example, the systems and methods implemented into a search engine can signal to users who owns an image or video on the web and where the digital asset comes from, can enforce copyright rules for the digital asset, can detect if the digital asset has been tampered with or has trust issues, and/or can enable the sale or transfer of digital content on the web (e.g., non-fungible token marketplaces for images, music, and/or another form of digital asset).

The systems and methods disclosed herein can include creator tokens. A Web3 model can enable creators to own their content and have a direct relationship with their followers/subscribers/fans, which can bypass today's platforms. This can be very disruptive to video platforms, but may be an opportunity for search engines, which may not be on the top of the mind for creators. Creator tokens can be a way for fans to "invest" in their favorite creators while also enabling creators to create a community around their fans.

In some implementations, the systems and methods disclosed herein can be utilized to provide an oracle system (e.g., a system that can provide service provider system for smart contracts to check whether something is real or has happened).

The systems and methods disclosed herein can include general information retrieval. The systems and methods can enable search to index the important parts of blockchain and make them accessible and useful.

The systems and methods can include decentralized autonomous organization, which can be used to automate decision making. In some implementations, information about decentralized autonomous organization of search engines can be provided and may make the decision making more transparent.

In some implementations, the systems and methods can enable ownership of any digital asset on the web by empowering creators and publishers to claim ownership of their digital content and set the rules of its usage in a scalable and high speed fashion. Additionally and/or alternatively, the systems and methods can enable ownership of any digital asset on the web by empowering search users to understand the provenance and history of a digital asset while also being able to take action on the digital asset in a way that is permitted by the original creator (e.g., buy the non-fungible token and/or use the non-fungible token as a ticket).

In some implementations, the systems and methods can simultaneously create carrots for creators and publishers to publish non-fungible content on the web while also giving them tools to create this content and set rules of usage for the content.

For example, the carrots can be created to show who owns an image on the web or show items published by a creator/publisher, can block copies of an 'owned' digital asset or at least transfer any revenue generated from it to the original owner, can enable a user to sell and monetize generated content, and can enable royalty fees.

Additionally and/or alternatively, the systems and methods can include tools for creators/publishers to create non-fungible content. For example, the systems and methods can give creators/publishers easy tools to publish non-fungible content and set rules for the content usage that can both be done by casual creators as well as sophisticated large scale players.

In some implementations, the systems and methods can include a smart contract blockchain that can be open, closed, and/or a hybrid of both.

The systems and methods can be implemented to enable a non-fungible token marketplace across various digital asset platforms (e.g., an image platform, a video hosting platform, and/or a music hosting platform) and/or across various service platforms (e.g., a search engine, a social media platform, and/or a blog platform). The creators and/or publishers can generate digital assets, mint the digital assets, sell the digital assets, and/or receive royalties for future sales of the digital assets.

The non-fungible tokens can be utilized to access private chat groups or blogs inside different platforms and communities, can be used to set up avatars that are verified as being owned by a particular user, can enable quick communication between creators and owners, and can provide transactional history that can be used for future releases and purchases by providing insightful suggestions.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining blockchain data, wherein the blockchain data comprises byte code associated with a blockchain;
processing the blockchain data to determine that a subset of the blockchain data comprises candidate token data, wherein the candidate token data is associated with a blockchain trigger event, wherein processing the blockchain data comprises:
storing the blockchain data in a sandbox;
parsing, within the sandbox, the blockchain data into a plurality of parsed segments;
determining a parsed segment of the subset of the blockchain data comprises non-fungible token characteristics;
determining an output action associated with the blockchain trigger event, wherein the output action is associated with a digital resource;
processing the output action to determine that the candidate token data is descriptive of a non-fungible token; and
providing identification data as an output, wherein the identification data is descriptive of the candidate token data being associated with the non-fungible token.

2. The system of claim 1, wherein processing the output action to determine the candidate token data is descriptive of the non-fungible token comprises:
determining an entity associated with the output action; and determining the entity is a digital resource being transferred in response to the blockchain trigger event.

3. The system of claim 1, wherein the operations further comprise:
   determining a validity of the candidate token data, wherein the validity is determined based on whether the candidate token data comprises determined problematic characteristics; and
   wherein the identification data is generated based at least in part on the validity.

4. The system of claim 1, wherein processing the output action to determine the candidate token data is descriptive of the non-fungible token comprises:
   determining the output action comprises a link to a landing address;
   obtaining landing data associated with the landing address;
   processing the landing data to determine the landing data comprises a digital resource; and
   determining the digital resource is associated with the non-fungible token.

5. The system of claim 1, wherein the operations further comprise:
   processing the output action to determine a digital resource associated with the non-fungible token;
   processing the digital resource to determine a quality of the digital resource; and
   determining whether to index the candidate token data based at least in part on the identification data and the quality of the digital resource.

6. The system of claim 5, wherein the quality of the digital resource is determined based on at least one of a resolution of the digital resource, a size of the digital resource, or a determined uniqueness of the digital resource.

7. The system of claim 1, wherein processing the output action to determine the candidate token data is descriptive of the non-fungible token comprises:
   obtaining, via an application programming interface, a uniform resource identifier.

8. The system of claim 1, wherein the candidate token data is determined based on one or more standards associated with non-fungible token code standards.

9. The system of claim 1, wherein the candidate token data comprises reference data associated with the digital resource.

10. A computer-implemented method, the method comprising:
    obtaining, by a computing system comprising one or more processors, blockchain data, wherein the blockchain data comprises byte code associated with a blockchain;
    processing, by the computing system, the blockchain data to determine that a subset of the blockchain data comprises candidate token data, wherein the candidate token data is associated with a blockchain trigger event, wherein processing the blockchain data comprises:
        storing the blockchain data in a sandbox;
        parsing, within the sandbox, the blockchain data into a plurality of parsed segments;
        determining a parsed segment of the subset of the blockchain data comprises non-fungible token characteristics;
    obtaining, by the computing system, standard data, wherein the standard data comprises one or more standards associated with standards for a non-fungible token;
    processing, by the computing system, the candidate token data to determine the candidate token data is associated with the one or more standards;
    generating, by the computing system, identification data based on the candidate token data being associated with the one or more standards, wherein the identification data is descriptive of the candidate token data being associated with the non-fungible token; and
    providing, by the computing system, the identification data as output.

11. The method of claim 10, further comprising:
    generating, by the computing system, index data based on the candidate token data and the identification data.

12. The method of claim 10, further comprising:
    processing, by the computing system, the blockchain trigger event to determine a digital resource associated with the non-fungible token;
    processing, by the computing system, the digital resource to determine the digital resource is vulgar; and
    determining, by the computing system, whether to index the candidate token data based at least in part on the identification data and the digital resource being vulgar.

13. The method of claim 10, wherein obtaining, by the computing system comprising the one or more processors, the blockchain data comprises:
    obtaining, by the computing system, first node data from a blockchain node, wherein the blockchain node is associated with a particular blockchain;
    processing, by the computing system, the first node data in the sandbox to generate a first portion of the blockchain data; and
    storing, by the computing system, the first portion of the blockchain data.

14. The method of claim 13, wherein obtaining, by the computing system comprising the one or more processors, the blockchain data comprises:
    obtaining, by the computing system, second node data from the blockchain node, wherein the blockchain node is associated with the particular blockchain;
    processing, by the computing system, the second node data in the sandbox to generate a second portion of the blockchain data; and
    storing, by the computing system, the second portion of the blockchain data.

15. One or more non-transitory computer-readable media that collectively store instructions that, when executed by one or more computing devices, cause the one or more computing devices to perform operations, the operations comprising:
    obtaining blockchain data, wherein the blockchain data comprises byte code associated with a blockchain;
    processing the blockchain data to determine a subset of the blockchain data comprises candidate token data, wherein the candidate token data is associated with a blockchain trigger event, wherein processing the blockchain data comprises:
        storing the blockchain data in a sandbox;
        parsing, within the sandbox, the blockchain data into a plurality of parsed segments;
        determining a parsed segment of the subset of the blockchain data comprises non-fungible token characteristics;
    processing the candidate token data to determine an intent associated with the candidate token data, wherein the candidate token data comprises reference data associated with a digital resource;

processing the intent to determine the candidate token data is descriptive of a non-fungible token; and providing identification data as an output, wherein the identification data is descriptive of the candidate token data being associated with the non-fungible token.

16. The one or more non-transitory computer-readable media of claim 15, wherein the intent is determined based at least in part on the blockchain trigger event.

17. The one or more non-transitory computer-readable media of claim 15, wherein the candidate token data comprises data descriptive of a smart contract.

18. The one or more non-transitory computer-readable media of claim 15, wherein the blockchain trigger event is an event that triggers the transfer of a payload of a smart contract.

19. The one or more non-transitory computer-readable media of claim 15, wherein the intent is a minting intent to publish the non-fungible token on the blockchain.

20. The one or more non-transitory computer-readable media of claim 15, wherein the intent is determined based at least in part on freeform text in the candidate blockchain data.

* * * * *